United States Patent
Wang

(10) Patent No.: US 10,430,729 B2
(45) Date of Patent: Oct. 1, 2019

(54) SYSTEM AND METHOD FOR SPECIFYING AND PROCESSING LEGALITY EXPRESSIONS

(71) Applicant: CONTENTGUARD HOLDINGS, INC., Wilmington, DE (US)

(72) Inventor: Xin Wang, Torrance, CA (US)

(73) Assignee: CONTENTGUARD HOLDINGS, INC., Wilmington, DE (US)

( * ) Notice: Subject to any disclaimer, the term of this patent is extended or adjusted under 35 U.S.C. 154(b) by 768 days.

(21) Appl. No.: 14/010,497

(22) Filed: Aug. 26, 2013

(65) Prior Publication Data

US 2013/0346324 A1   Dec. 26, 2013

Related U.S. Application Data

(63) Continuation of application No. 10/424,785, filed on Apr. 29, 2003, now Pat. No. 8,543,511.

(Continued)

(51) Int. Cl.

| | |
|---|---|
| *G06Q 10/00* | (2012.01) |
| *G06F 21/10* | (2013.01) |
| *G06F 21/62* | (2013.01) |
| *G06Q 10/10* | (2012.01) |
| *G06Q 40/00* | (2012.01) |

(Continued)

(52) U.S. Cl.
CPC ............ *G06Q 10/00* (2013.01); *G06F 21/10* (2013.01); *G06F 21/6209* (2013.01); *G06Q 10/10* (2013.01); *G06Q 40/00* (2013.01); *G06Q 50/184* (2013.01); *G07C 9/00007* (2013.01); *G06F 2221/2137* (2013.01); *G06F 2221/2153* (2013.01)

(58) Field of Classification Search
CPC ................................ G06Q 10/00; G06F 21/00
USPC ........................................................... 705/59
See application file for complete search history.

(56) References Cited

U.S. PATENT DOCUMENTS

| | | |
|---|---|---|
| 4,278,837 A | 7/1981 | Best |
| 4,658,093 A | 4/1987 | Hellman |

(Continued)

FOREIGN PATENT DOCUMENTS

| | | |
|---|---|---|
| EP | 0268139 A2 | 5/1988 |
| EP | 0567800 A1 | 11/1993 |

OTHER PUBLICATIONS

PDF Reference (Second Edition), Adobe Portable Document Format, Version 1.3, Adobe Systems Incorporated, 1985-2000, Addison-Wesley.

(Continued)

*Primary Examiner* — Chrystina E Zelaskiewicz
(74) *Attorney, Agent, or Firm* — Rimon PC

(57) ABSTRACT

A system and method are provided for specifying a legality expression for use in a system for processing the legality expression. The system and method include providing a legality expression language, including at least one of a duty element specifying an obligation that a principal must perform an act, a ban element specifying a prohibition that a principal must not perform an act, an intent element specifying an intention that a principal wants to perform an act, and a claim element specifying an assertion that a principal does perform an act. The system and method further include interpreting by the system a legality expression specified using the legality expression language.

21 Claims, 10 Drawing Sheets

Related U.S. Application Data

(60) Provisional application No. 60/375,808, filed on Apr. 29, 2002, provisional application No. 60/411,789, filed on Sep. 19, 2002.

(51) Int. Cl.
*G07C 9/00* (2006.01)
*G06Q 50/18* (2012.01)

(56) References Cited

U.S. PATENT DOCUMENTS

| | | | |
|---|---|---|---|
| 4,937,863 A | 6/1990 | Robert et al. | |
| 4,977,594 A | 12/1990 | Shear | |
| 5,109,413 A | 4/1992 | Comerford et al. | |
| 5,204,897 A | 4/1993 | Wyman | |
| 5,260,999 A | 11/1993 | Wyman | |
| 5,412,717 A | 5/1995 | Fischer | |
| 5,477,263 A | 12/1995 | O'Callaghan et al. | |
| 5,557,518 A | 9/1996 | Rosen | |
| 5,629,980 A | 5/1997 | Stefik et al. | |
| 5,634,012 A | 5/1997 | Stefik et al. | |
| 5,673,316 A | 9/1997 | Auerbach et al. | |
| 5,717,604 A | 2/1998 | Wiggins | |
| 5,892,900 A | 4/1999 | Ginter et al. | |
| 5,940,504 A | 8/1999 | Griswold | |
| 6,044,466 A | 3/2000 | Anand et al. | |
| 6,135,646 A | 10/2000 | Kahn et al. | |
| 6,226,618 B1 | 5/2001 | Downs et al. | |
| 6,253,193 B1* | 6/2001 | Ginter .................. | G06F 21/10 348/E5.006 |
| 6,327,652 B1 | 12/2001 | England et al. | |
| 6,389,538 B1 | 5/2002 | Gruse et al. | |
| 6,708,157 B2 | 3/2004 | Stefik et al. | |
| 6,963,859 B2 | 11/2005 | Stefik et al. | |
| 7,225,160 B2 | 5/2007 | Stefik et al. | |
| 7,269,576 B2 | 9/2007 | Stefik et al. | |
| 7,523,072 B2 | 4/2009 | Stefik et al. | |
| 7,774,280 B2 | 8/2010 | Wang et al. | |
| 8,001,053 B2 | 8/2011 | Nguyen et al. | |
| 8,001,054 B1 | 8/2011 | Peart et al. | |
| 8,370,956 B2 | 2/2013 | Stefik et al. | |
| 8,393,007 B2 | 3/2013 | Stefik et al. | |
| 2002/0077984 A1 | 6/2002 | Ireton | |
| 2002/0107809 A1* | 8/2002 | Biddle .................. | G06Q 10/10 705/59 |

OTHER PUBLICATIONS

Adobe Acrobat 2.0, Information Products Group, Adobe Systems Incorporated, 1994.
File History of U.S. Pat. No. 7,225,160 filed Dec. 17, 2001.
File History of U.S. Pat. No. 7,269,576 filed Feb. 9, 2004.
File History of U.S. Appl. No. 08/967,095 & U.S. Appl. No. 08/344,760 filed Nov. 10, 1997 & Nov. 23, 1994.
Final Decision in *ZTE Corporation and ZTE (USA) Inc.* v. *ContentGurard Holdings Inc.*, IPR2013-00133, Paper 61 (Jul. 1, 2014).
Final Office Action dated Apr. 17, 2006 for U.S. Appl. No. 10/956,070, filed Oct. 4, 2004.
Final Office Action dated May 24, 2006 for U.S. Appl. No. 10/162,701, filed Jun. 6, 2002.
Glenn C. Reid, Thinking in Postscript, Addison-Wesley (1990).
*Google Inc.* v. *Inventor Holdings, LLC*, CBM2014-00002, Paper No. 16 (Apr. 1, 2014).
*Hulu, LLC* v. *Intertainer, Inc.* Case CBM2014-00053, Paper 11 (Jun. 23, 2014).
Iann Ella, R., Open Digital Rights Language (ODRL), Version 7, http://xml.coverpages.org/ODRL-07.pdf (Oct. 13, 2000).
Kahin, Brian, The Strategic Environment for Protecting Multimedia, IMA Intellectual Property Project Proceedings, Jan. 1994.
Kahn R.E., et al., "The Digital Library Project, vol. 1: The World of Knowbots (DRAFT), An Open Architecture for a Digital Library System and A Plan for its Development," Corporation for National Research Initiatives, Mar. 1988, pp. 1-48.
Moffett J., et al., Specifying Discretionary Access Control Policy for Distributed Systems, Computer Communications, vol. 13(9), pp. 571-580 (Nov. 1990).
Mori, R., Superdistribution: The Concept and Architecture, The Transactions of the Institute of Electronics, Information and Comm. Engineers (Jul. 1990), No. 7, pp. 1133.
Morin, J., Commercialization of Electronic Information, Journal of Organizational and End User Computing, vol. 12, Issue 2 (Apr. 1, 2000).
Needham & Schroeder, Using Encryption for Authentication in Large Networks of Computers (Dec. 1978).
Non-Final Office Action dated Aug. 10, 2007 for U.S. Appl. No. 10/162,701, filed Jun. 6, 2002.
Non-Final Office Action dated Apr. 15, 2008 for U.S. Appl. No. 10/956,121, filed Oct. 4, 2004.
Non-Final Office Action dated Oct. 21, 2005 for U.S. Appl. No. 10/162,701, filed Jun. 6, 2002.
Non-Final Office Action dated Oct. 25, 2005 for U.S. Appl. No. 10/956,070, filed Oct. 4, 2004.
Notice of Abandonment dated May 2, 2011 for U.S. Appl. No. 10/162,701, filed Jun. 6, 2002.
Petition for Inter Partes Review (IPR Case No. IPR2015-00351) of U.S. Pat. No. 7,774,280 filed Dec. 10, 2014.
Petition for Inter Partes Review (IPR Case No. IPR2015-00352) of U.S. Pat. No. 7,774,280 filed Dec. 10, 2014.
Petition for Inter Partes Review (IPR Case No. IPR2015-00353) of U.S. Pat. No. 7,774,280 filed Dec. 10, 2014.
Petition for Inter Partes Review (IPR Case No. IPR2015-00354) of U.S. Pat. No. 7,774,280 filed Dec. 10, 2014.
Petition for Inter Partes Review (IPR Case No. IPR2015-00355) of U.S. Pat. No. 8,001,053 filed Dec. 10, 2014.
Petition for Inter Partes Review (IPR Case No. IPR2015-00356) of U.S. Pat. No. 8,001,053 filed Dec. 10, 2014.
Petition for Inter Partes Review (IPR Case No. IPR2015-00357) of U.S. Pat. No. 8,001,053 filed Dec. 10, 2014.
Petition for Inter Partes Review (IPR Case No. IPR2015-00358) of U.S. Pat. No. 8,001,053 filed Dec. 10, 2014.
Petition for Inter Partes Review (IPR Case No. IPR2015-00440) of U.S. Pat. No. 6,963,859 filed Dec. 22, 2014.
Petition for Inter Partes Review (IPR Case No. IPR2015-00441) of U.S. Pat. No. 6,963,859 filed Dec. 22, 2014.
Petition for Inter Partes Review (IPR Case No. IPR2015-00442) of U.S. Pat. No. 6,963,859 filed Dec. 22, 2014.
Petition for Inter Partes Review (IPR Case No. IPR2015-00443) of U.S. Pat. No. 7,523,072 filed Dec. 22, 2014.
Petition for Inter Partes Review (IPR Case No. IPR2015-00444) of U.S. Pat. No. 7,523,072 filed Dec. 22, 2014.
Petition for Inter Partes Review (IPR Case No. IPR2015-00445) of U.S. Pat. No. 7,523,072 filed Dec. 22, 2014.
Petition for Inter Partes Review (IPR Case No. IPR2015-00446) of U.S. Pat. No. 8,370,956 filed Dec. 22, 2014.
Petition for Inter Partes Review (IPR Case No. IPR2015-00447) of U.S. Pat. No. 8,370,956 filed Dec. 22, 2014.
Petition for Inter Partes Review (IPR Case No. IPR2015-00449) of U.S. Pat. No. 8,393,007 filed Dec. 22, 2014.
Petition for Inter Partes Review (IPR Case No. IPR2015-00450) of U.S. Pat. No. 8,393,007 filed Dec. 22, 2014.
Petition for Inter Partes Review (IPR Case No. IPR2015-00451) of U.S. Pat. No. 8,393,007 filed Dec. 22, 2014.
Petition for Inter Partes Review (IPR Case No. IPR2015-00452) of U.S. Pat. No. 7,269,576 filed Dec. 22, 2014.
Petition for Inter Partes Review (IPR Case No. IPR2015-00454) of U.S. Pat. No. 7,269,576 filed Dec. 22, 2014.
Petition for Inter Partes Review (IPR Case No. IPR2015-00455) of U.S. Pat. No. 7,269,576 filed Dec. 22, 2014.
Petition for Inter Partes Review (IPR Case No. IPR2015-00456) of U.S. Pat. No. 7,269,576 filed Dec. 22, 2014.
Petition for Inter Partes Review (IPR Case No. IPR2015-00457) of U.S. Pat. No. 7,225,160 filed Dec. 22, 2014.
Petition for Inter Partes Review (IPR Case No. IPR2015-00458) of U.S. Pat. No. 7,225,160 filed Dec. 22, 2014.

(56) References Cited

OTHER PUBLICATIONS

Record of Oral Hearing, Sessions 1 and 2, in *ZTE Corporation and ZTE (USA) Inc. v. ContentGuard Holdings Inc.*, IPR2013-00138, Paper 54.
Remarks in Amendment of U.S. Appl. No. 10/956,070 dated Nov. 22, 2010.
Remarks in Amendment of U.S. Appl. No. 10/956,070 dated Oct. 31, 2007.
Remarks in Amendment of U.S. Appl. No. 10/956,121 dated Mar. 15, 2010.
S. White & L. Comerford, ABYSS: A Trusted Architecture for Software Protection (1990).
*Salesforce.com, Inc. v. Virtualagility, Inc.*, CBM2013-00024, Paper No. 47 (Sep. 16, 2014).
*SAP America, Inc. v. Versata Dev. Group, Inc.*, CBM2012-00001, Paper 36 (Jan. 9, 2013).
*SAP America, Inc. v. Versata Development Group, Inc.*, CBM2012-00001, Paper No. 70 (Jun. 11, 2013).
Steiner et al., Kerberos: An Authentication Service for Open Network Systems (MIT 1988).
Summons in Case No. 2:13-CV-01112.
T. Berners-Lee & D. Connolly, RFC 1866, Hypertext Markup Language v2.0 (Nov. 1995).
The Copy-Protection Wars, PC Magazine Cover, Table of contents, 164-182, 1986.
The Digital Property Rights Language—Manual and Tutorial—XML Edition, Version 2, http://xml.coverpages.org/DPRLmanual-XML2.html (Nov. 13, 1998).
*Ultramercial, Inc. et al. v. Hulu, LLC et al.*, 2010-1544 (Fed Cir. Nov. 14, 2014).
U.S. Appl. No. 60/296,113, filed Jun. 7, 2001.
U.S. Appl. No. 60/296,117, filed Jun. 7, 2001.
U.S. Appl. No. 60/296,118, filed Jun. 7, 2001.
U.S. Appl. No. 60/331,621, filed Nov. 20, 2001.
U.S. Appl. No. 60/331,623, filed Nov. 20, 2001.
U.S. Appl. No. 60/331,624, filed Nov. 20, 2001.
*Alice Corp. Pty. Ltd. v. CLS Bank Int'l*, 134 S.Ct. 2347 (Jun. 19, 2014).
American Heritage Dictionary Third Edition.
Amir Herzberg, Shlomit S. Pinter, "Public Protection of Software," in Advances in Cryptology: Proc. Crypto 85, Hugh C. Williams (cd.), pp. 158 (1986).
*Apple Inc. v. Sightsound Techs., LLC*, CBM2013-00019, Paper No. 17 (Oct. 8, 2013).
*Bloomberg Inc. et al. v. Markets-Alert PTY LTD*, CBM2013-00005, Paper No. 18 (Mar. 29, 2013).
Bruce Schneier, Applied Cryptography (Chapters 1-3, 7, 12, 13, 17)—1994.
Cina V., et al., ABYSS: A Basic Yorktown Security System: PC Asset Protection Concepts, IBM Research Report No. RC 12401 (Dec. 1986).
Comparison of Specification of U.S. Appl. No. 08/967,084 to Specification of U.S. Appl. No. 09/778,001.
Comparison of Specification of U.S. Appl. No. 09/778,001 to Specification of U.S. Pat. No. 7,225,160.
Comparison of Stefik '980 Patent to Specification of U.S. Appl. No. 09/778,001.
Complaint, *ContentGuard Holdings, Inv. V. Google Inc.*, Case No. 2:14-cv-00061-JRG-RSP (E.D. Tex.), Dkt. No. 1.
Congressional Record—Senate, 157 Cong. Rec. 51360-1394 (daily ed. Mar. 8, 2011) (Sen. Schumer).
Curriculum Vitae for Alan Sherman.
Curriculum Vitae of Atul Prakash.
D. Denning, Cryptography and Data Security (1982).
Data networks and open system communicationjs X.509 Standard.
Davida G., et al., Defending Systems Against Viruses through Cryptographic Authentication, IEEE 1989.
Decision on Appeal, U.S. Appl. No. 10/162,212 (BPAI) dated Dec. 16, 2009.
Decision to Institute in *ZTE Corporation and ZTE (USA) Inc. v. ContentGuard Holdings Inc.*, IPR2013-00133, Paper 15 (Jul. 1, 2013).
Decision to Institute in *ZTE Corporation and ZTE (USA)Inc. v. ContentGuard Holdings Inc.*, IPR2013-00134, Paper 12 (Jun. 19, 2013).
Decision to Institute in *ZTE Corporation and ZTE (USA) Inc. v. ContentGuard Holdings Inc.*, IPR2013-00136, Paper 11 (Jul. 16, 2013).
Decision to Institute in *ZTE Corporation and ZTE (USA) Inc. v. ContentGuard Holdings Inc.*, IPR2013-00137, Paper 17 (Jul. 1, 2013).
Decision to Institute in *ZTE Corporation and ZTE (USA) Inc. v. ContentGuard Holdings Inc.*, IPR2013-00138, Paper 17 (Jul. 1, 2013).
Decision to Institute in *ZTE Corporation and ZTE (USA) Inc. v. ContentGuard Holdings Inc.*, IPR2013-00139, Paper 15 (Jul. 9, 2013).
Declaration of Alan Sherman, Ph. D. regarding patents 859, 072, 956, 007, 576.
Declaration of Dr. Goodrich in support of ContentGuard's Opening Claim Construction Brief—Exhibit K of Doc. No. 304.
Definition of "Meta," Oxford English Dictionary www.oxforddictionaries.com/definition/english/meta.
Definition of "Processor," The American Heritage® Dictionary of the English Language, Fourth Edition, 2000 Houghton Mifflin Company, available at http://www.thefreedictionary.com/processor.
Definition of "Right," Merriam-Webster Online Dictionary, available at http://www.merriam-webster.com/dictionary/right.
Definition of "Variable," The Free Dictionary, available at http://www.thefreedictionary.com/variable+%28computer+science%29.
Diffie-Hellman, "New Directions in Cryptography," IEEE Transactions on Information Theory, vol. IT-22, No. 6, Nov. 1976.
*EBay, Inc. v. Paid, Inc.*, CBM2014-00125, Paper No. 15 (Sep. 30, 2014).
Electronic Books Exchange (EBX) Specification 0.8 (Jul. 2000).
*Experian Marketing Solutions, Inc. v. RPost Communications Ltd.*, CBM2014-00010, Paper No. 20 (Apr. 22, 2014).
Federal Information Processing Standards Publication PUB 140-1,dated Jan. 11, 1994.
File History for U.S. Appl. No. 10/163,634, Feb. 18, 2010 Decision on Appeal.
File History for U.S. Pat. No. 7,774,280, Dec. 29, 2008 Non-Final Rejection.
File History for U.S. Pat. No. 7,774,280, Mar. 29, 2010 Notice of Allowance.
File History for U.S. Pat. No. 7,774,280, May 28, 2009 Applicant Response to Final Rejection.
File History for U.S. Pat. No. 8,001,053, Aug. 13, 2008 Applicant Appeal Brief.
File History for U.S. Pat. No. 8,001,053, Mar. 16, 2010 Supplemental Examiner's Answer to Appeal Brief.
*Volusion, Inc. v. Versata Software, Inc. et al.*, CBM2013-00017, Paper No. 8 (Oct. 24, 2013).
White, S., et al., ABYSS: A Trusted Architecture for Software Protection, IEEE (1987).

\* cited by examiner

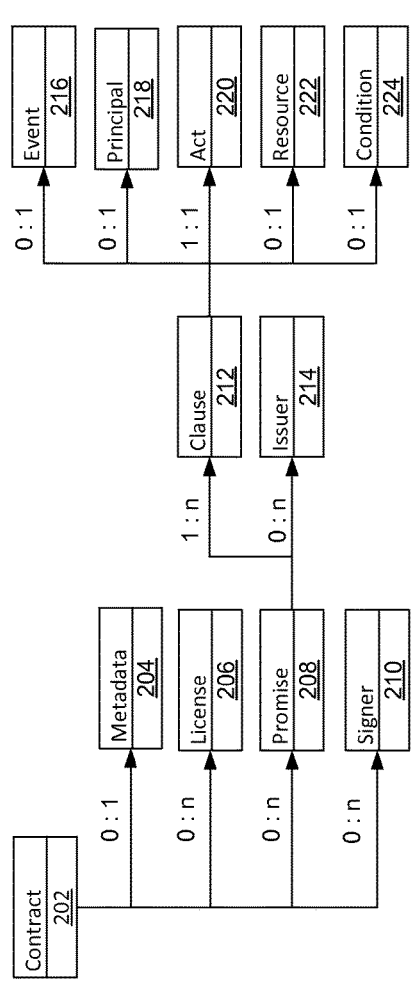
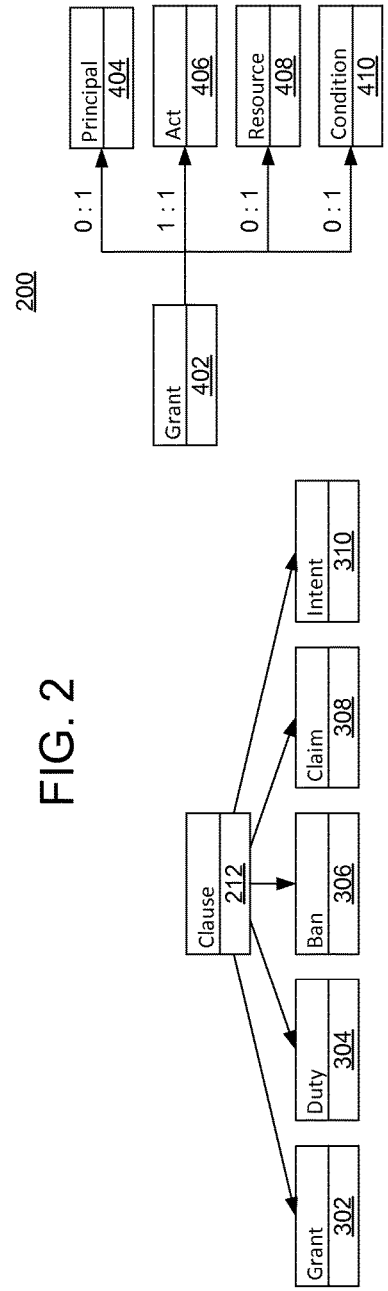
FIG. 2
FIG. 3
FIG. 4

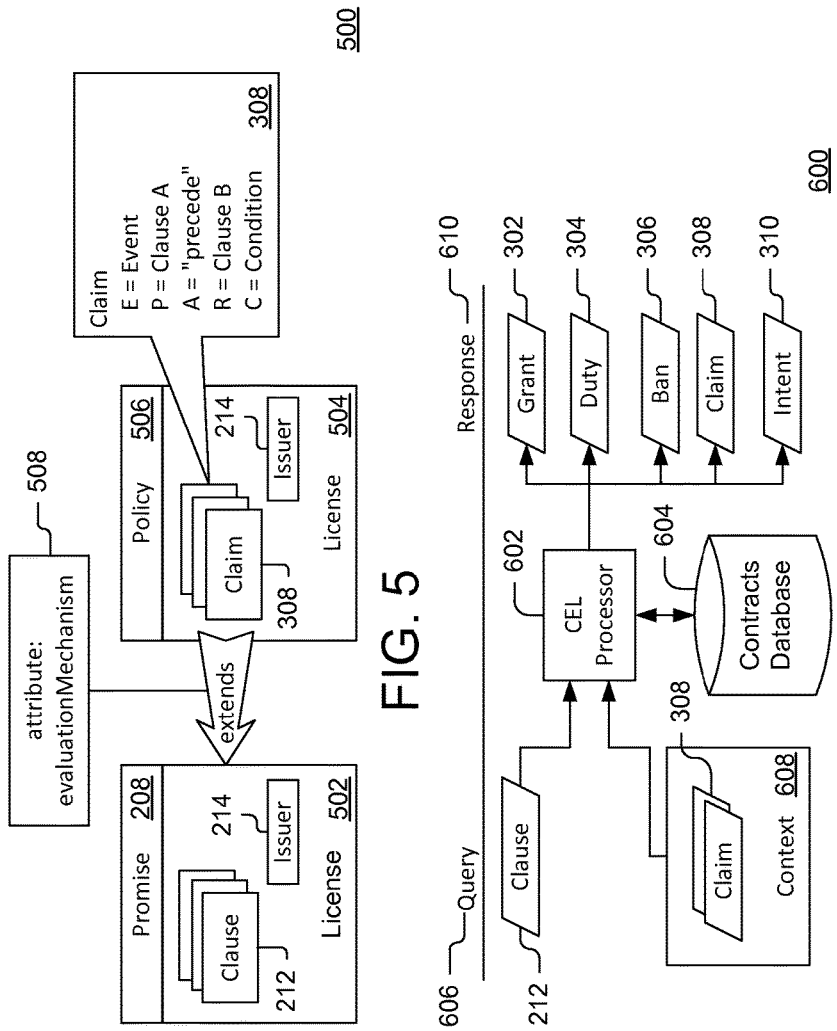

SYSTEM AND METHOD FOR SPECIFYING AND PROCESSING LEGALITY EXPRESSIONS

CROSS REFERENCE TO RELATED DOCUMENTS

This application is a continuation of U.S. application Ser. No. 10/424,785, filed Apr. 29, 2003, now allowed, which claims benefit of priority to U.S. Provisional Patent Application Ser. No. 60/375,808, filed Apr. 29, 2002, and U.S. Provisional Patent Application Ser. No. 60/411,789, filed Sep. 19, 2002, the entire disclosures of which are hereby incorporated by reference herein in their entireties.

BACKGROUND OF THE INVENTION

Field of the Invention

The present invention generally relates to systems and methods for Digital Rights and Contracts Management, and more particularly a system and method for specifying and processing legality expressions, such as contracts, within a Digital Rights and Contracts Management system.

Description of Related Art

One of the most important issues concerning the widespread distribution of digital content, such as documents, music, movies, software, information, and the like, in forms usable by computing devices, via electronic means, and the Internet in particular, is the provision of the ability to enforce the intellectual property rights during the distribution and use of the digital content. Technologies for resolving this problem are referred to as Digital Rights Management (DRM) herein. However, there are a number of issues to be considered in effecting a DRM system, such as authentication, authorization, accounting, payment and financial clearing, rights specification, rights verification, rights enforcement, and document protection issues, to name but a few.

For example, in the world of printed documents and other physical content, a work created by an author is usually provided to a publisher, which formats and prints numerous copies of the work. The copies are then sent by a distributor to bookstores or other retail outlets, from which the copies are purchased by end users. While the low quality of copying and the high cost of distributing printed material have served as deterrents to unauthorized copying of most printed documents, it is much easier to copy, modify, and redistribute unprotected digital content with high quality. Therefore, there is a need for mechanisms to protect digital content.

Difficulties associated with preventing, or even deterring, people from making unauthorized copies of electronic content within current general-purpose computing and communications systems, such as personal computers, workstations, and other devices connected over communications networks, such as local area networks (LANs), intranets, and the Internet, are widely recognized. Many attempts to provide hardware-based solutions to prevent unauthorized copying have proven to be unsuccessful. Moreover, the deployment of high bandwidth or broadband communications technologies and the development of what is presently known as the National Information Infrastructure (NII) is making it more convenient to distribute large documents electronically, including video files, such as full length motion pictures, and this makes it easier to proliferate unauthorized copying and distribution of digital content. Therefore, the need for further development of DRM technologies is becoming a high priority.

Accordingly, commonly-assigned U.S. Pat. No. 5,634,012 discloses a DRM system for controlling the distribution of digital content, wherein devices of the DRM system can include a repository associated therewith. A predetermined set of usage transaction steps define a protocol used by the repositories for enforcing usage rights associated with the content. Usage rights persist with the content and the usage rights associated with the content comprise a digital work. The usage rights can permit various manners of use of the content, such as a right to view or print or display the content, a right to use the content only once, a right to distribute or redistribute the content, and the like. Such usage rights can be made contingent on payment or other conditions. However, there is a need for systems and methods that enable one or more parties to easily and securely manage, exchange, interpret, enforce, and the like, legality expressions information, such as contracts-related information.

SUMMARY OF THE INVENTION

The above and other needs are addressed by embodiments of the present invention, which provide an improved system and method specifying and processing contracts.

Accordingly, in one aspect of an embodiment of the present invention, there is provided a method for specifying a legality expression for use in a system for processing said legality expression. The method includes providing a legality expression language, including at least one of a duty element specifying an obligation that a principal must perform an act, a ban element specifying a prohibition that a principal must not perform an act, an intent element specifying an intention that a principal wants to perform an act, and a claim element specifying an assertion that a principal does perform an act. The method further includes interpreting by said system a legality expression specified using said legality expression language.

In another aspect of an embodiment of the present invention, there is provided a system for processing a legality expression including means for providing a legality expression language. The legality expression language includes at least one of a duty element specifying an obligation that a principal must perform an act, a ban element specifying a prohibition that a principal must not perform an act, an intent element specifying an intention that a principal wants to perform an act, and a claim element specifying an assertion that a principal does perform an act. The system further includes means for interpreting a legality expression specified using the legality expression language.

In a further aspect of an embodiment of the present invention, there is provided a legality expression adapted for use in a system for processing the legality expression. The legality expression includes at least one of a duty element specifying an obligation that a principal must perform an act, a ban element specifying a prohibition that a principal must not perform an act, an intent element specifying an intention that a principal wants to perform an act, and a claim element specifying an assertion that a principal does perform an act, whereby a computer system can interpret the legality expression.

Still other aspects, features, and advantages of the present invention are readily apparent from the following detailed description, simply by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 illustrates an exemplary contract data model of an exemplary Contract Expression Language that can be employed in the Digital Rights Management system of FIG. 1;

FIG. 3 illustrates exemplary clauses that can be employed in the exemplary contract data model of FIG. 2;

FIG. 4 illustrates an exemplary model of an eXtensible Rights Markup Language (XrML) grant;

FIG. 5 illustrates an exemplary preference policy model for allowing setting of priorities for resolving conflicts and multiplicities and that can be employed in the exemplary contract data model of FIG. 2;

FIG. 6 illustrates an exemplary query-driven processing system based on the exemplary Contract Expression Language;

DETAILED DESCRIPTION OF THE INVENTION

Figure 1:
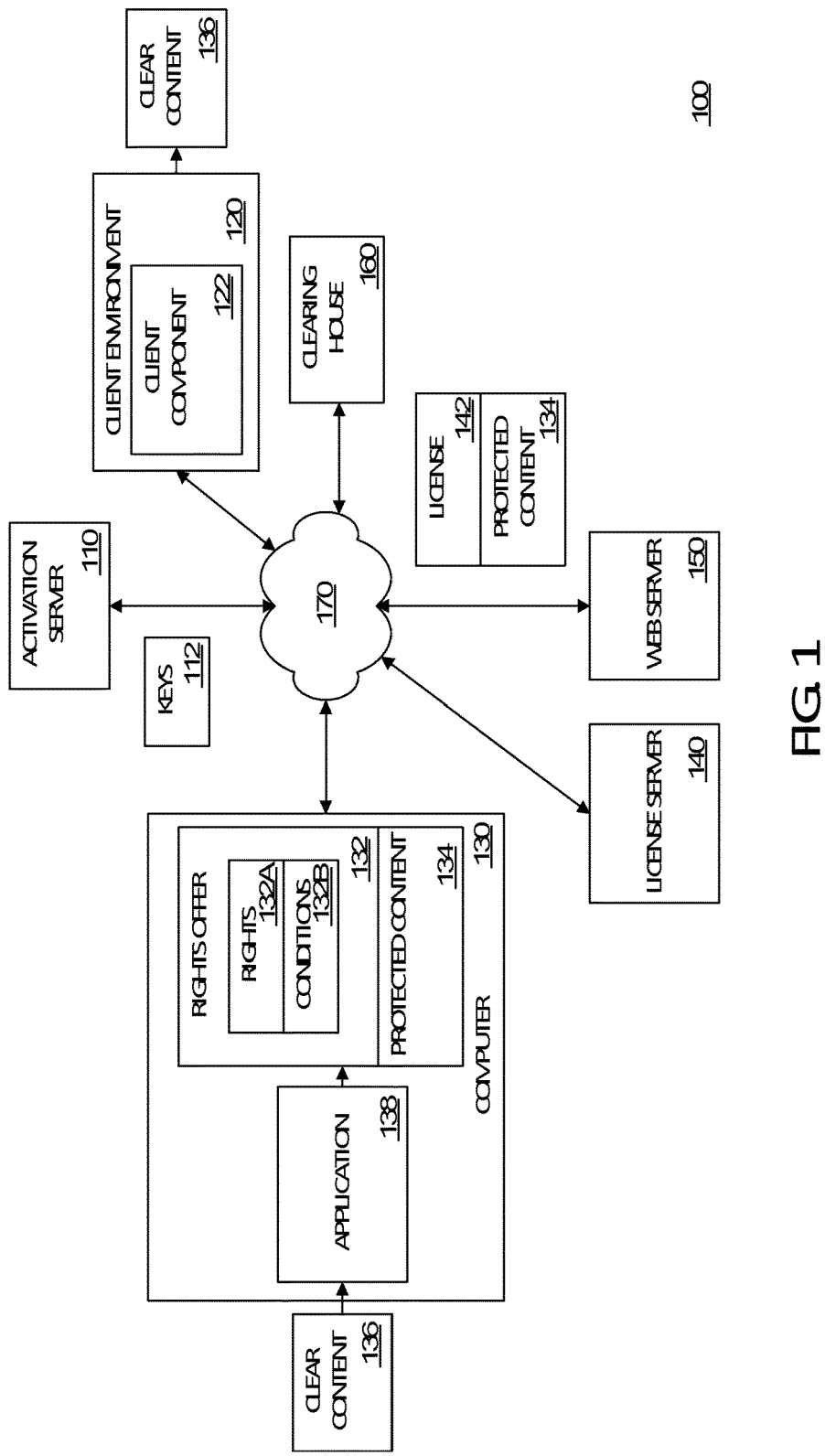
FIG. 1 illustrates an exemplary Digital Rights Management system on which various embodiments of the present invention can be implemented.

A system and method for specifying and processing contracts are described. In the following description, for purposes of explanation, numerous specific details are set forth in order to provide a thorough understanding of the present invention. It is apparent to one skilled in the art, however, that the present invention can be practiced without these specific details or with equivalent arrangements. In some instances, well-known structures and devices are shown in block diagram form in order to avoid unnecessarily obscuring the present invention.

As noted above, authentication, authorization, accounting, payment and financial clearing, rights specification, rights verification, rights enforcement, and document protection issues should be addressed by a Digital Rights Management system. Commonly-assigned U.S. Pat. Nos. 5,530,235, 5,629,980, 5,634,012, 5,638,443, 5,715,403, 6,233,684, and 6,236,971, the entire disclosures of all of which are hereby incorporated by reference herein, disclose DRM systems addressing these and other issues.

The present invention can employ technologies, systems, methods, algorithms, concepts, and the like, for example, as further described in the articles, books, specifications, and the like, cited throughout the present disclosure by numerals enclosed within brackets in bold print [ . . . ] and cross-referenced in the APPENDIX provided herein, the entire contents of all of which are hereby incorporated by reference herein.

Generally, the exemplary embodiments can be employed for legality expression specification, processing, execution, management, and the like, such as contract specification, processing, execution, and management. For example, the exemplary embodiments include mechanisms to enable the specifying of legality expressions, and systems that interpret and execute such expressions in order to regulate behaviors of system entities, users, and the like.

The exemplary embodiments introduce an exemplary Legality Expression Language (LEL), for example, based on eXtensible Markup Language (XML), eXtensible rights Markup Language (XrML) [1], and the like, and that can include an exemplary Contract Expression Language (CEL). The exemplary Contract Expression Language, advantageously, allows, for example, for the expression of contractual agreements between participants in electronic content, service distribution value chains, and the like. The exemplary embodiments, advantageously, can be applied to online and offline environments.

The exemplary Contract Expression Language can include a machine readable language for expressing electronic contracts and a machine interpretable semantic model for contracts expressed in the exemplary Contract Expression Language. The exemplary Contract Expression Language can support the entire lifecycle of a contract and the exemplary embodiments include various exemplary processing systems of the exemplary Contract Expression Language to allow contract performance and execution among contract participants.

In the exemplary embodiments, the key words "must," "must not," "required," "shall," "shall not," "should," "should not," "recommended," "may," and "optional," for example, can be used in statements or expressions specified with the exemplary Contract Expression Language for indicating requirement levels and, for example, can be interpreted as described in IETF RFC 2119 [4]. In the exemplary embodiments, an act can include the process or state of doing or performing something. In the exemplary embodiments, an event can include something that takes place, can be captured and is worth annotating, and the like. An act can differ from an event in that an act can become an event when the act is performed. The concept of a right or an obligation can be abstractions of an act.

In the exemplary embodiments, an agreement can include an arrangement between parties regarding a course of action, for example, such as the stage in contracts law at which the negotiations between the parties are complete. The foundation of the legal relation called a "contract" is the agreement of the parties. Thus, an agreement can include the writing or document embodying a contract.

In the exemplary embodiments, an assertion can include a declaration of performing some act. In the exemplary embodiments, a condition can include something, for example, indispensable to the appearance or occurrence of another.

In the exemplary embodiments, a contract, for example, can include a promise, or set of promises, for the breach of which the law gives a remedy, or the performance of which the law in some way recognizes as a duty [14], an agreement or covenant between two or more persons, in which each party binds him or herself to do or forbear some act, and each acquires a right to what the other promises, and the like.

In the exemplary embodiments, an intention can include a course of action that one intends to follow, an obligation can include a commitment that requires someone to perform some act, a permission can include a right, a principal can include an encapsulation of the identification of an entity involved in the performing of an act, a prohibition can include a requirement that forbids someone to perform an act, and a promise can include a manifestation of intention to act or refrain from acting in a specified way [14]. In the exemplary embodiments, a resource can include an object to which a principal may perform some act. For example, a resource can include a digital work, such as an e-book, an audio or video file, an image, and the like, a service, such as an email service, a Business to Business (B2B) transaction service, and the like, a piece of information that can be owned by a principal, such as a name, an email address, and the like.

In the exemplary embodiments, a right can include a privilege that entitles someone to perform an act, a breach can include the failure of a party of a contract to perform a contractual obligation, an offer can include a promise to do or refrain from doing some specified thing in the future conditioned upon acceptance of the promisee [14], a remedy can include an act of correcting an error or a fault, and a warranty can include a contractual term for a guarantee or assurance, breach of which gives rise to a right to claim damages, but not to a right to reject the subject matter of the contract or to treat the contract as repudiated.

In addition to expressing contract information, for example, related to permissions, obligations, prohibitions, and the like, the exemplary Contract Expression Language can be employed to define language constructs, such as "claim," "intent," and the like, advantageously, supporting contractual agreements and meeting processing requirements throughout the lifecycle of a contract. Advantageously, the exemplary Contract Expression Language expressions, for example, can be human processed, machine processed, and the like.

In addition to an exemplary data model and exemplary vocabularies of the exemplary Contract Expression Language, the exemplary Contract Expression Language can be used to provide programming language precision to ensure that the corresponding expressions can be interpretable by machines, humans, and the like, in an unambiguous manner. Advantageously, the exemplary Contract Expression Language can be employed for electronic content distribution contracts, electronic service distribution contracts, and the like, as well as for describing, interpreting, executing, and the like, any suitable contractual agreements.

The exemplary Contract Expression Language can be based on XrML, an XML-based language, for example, for specifying declarative statements or expressions about usage rights and associated conditions thereof that are offered and granted by rights holders of, for example, content, resources, services, and the like. An XrML rights statement or expression typically can be employed for declaring that someone "may" exercise a specified right upon a specified resource, subject to a specified condition. However, an XrML rights statement or expression typically does not convey the notion that someone "must" exercise a right when a condition is met. For example, an XrML rights statement or expression "may" grant a person the right to vote, but typically cannot specify that such a person "must" vote.

By contrast, the exemplary Contract Expression Language can be employed, advantageously, to express statements or expressions, such as "someone must do something," "someone must not do something," and the like. Advantageously, the exemplary Contract Expression Language can be employed in business situations dealing with contractual relationships, agreements, and the like. For example, a contract stipulating that someone must or is required to perform an action when a condition is met, such as "Party A must deliver goods when Party B has paid for the goods," advantageously, can be expressed with the exemplary Contract Expression Language.

In event management, some events are bound to happen if a triggering condition is satisfied, for example, such as "a clerk must remind a customer when a rented video is overdue," "to discourage piracy, the current top 40 list cannot be packaged at better than 8 bits amplitude resolution," and the like. Advantageously, the exemplary Contract Expression Language can be employed to specify such statements of an obligatory or prohibitory type, as well as statements of a permissive type.

In addition, the exemplary Contract Expression Language, advantageously, supports specifying statements of an intentional type, statements of a factual type, statements of an exclusive type, and the like. Further, the exemplary Contract Expression Language supports the defining of preference rules, advantageously, for resolving potential conflicts and multiplicities that can be raised when interpreting a set of statements of a permissive, obligatory, or prohibitory type.

The exemplary Contract Expression Language, advantageously, can be employed to specify statements of the intentional type. For example, the exemplary Contract Expression Language can be used to express the intent between parties to enter a contractual agreement, advantageously, facilitating the construction of queries to a contract management system, for example, implemented on the Digital Rights Management system of FIG. 1, and the like.

The exemplary Contract Expression Language, advantageously, can be employed to specify statements of the factual type. For example, the exemplary Contract Expression Language can be used to certify the fulfillment of actions specified in a contract, advantageously, addressing the requirements for the backend of a contract lifecycle.

The exemplary Contract Expression Language, advantageously, can be employed to specify statements of the exclusivity type. For example, the exemplary Contract Expression Language can be used to express exclusivity, a common requirement in business contracts. Advantageously, preference mechanisms of the exemplary Contract Expression Language, for example, can be used to facilitate prioritization and conflict resolution between elements within a single contract, between multiple contracts, and the like.

The exemplary Contract Expression Language, for example, can include XrML elements, and leverage from the XrML design principles and extensibility structures. Advantageously, the exemplary Contract Expression Language can be integrated with XrML, providing flexible, interoperability, mechanisms to support many forms of contracts, for example, including business contracts for the supply, distribution, and consumption of content, resources, services, and the like.

In an exemplary embodiment, a contract can include a promise, or set of promises, for the breach of which the law gives a remedy, or the performance of which the law in some way recognizes as a duty [14]. Two or more parties can draft a contract to declare the consent of the parties to an act or a thing to be done or to forborne action by some of the parties or other parties. For example, the statement "Alice must sell her house to Bob upon receiving a payment of $500,000 from Bob by Apr. 30, 2002, signed by both Alice and Bob" can be a contract, advantageously, which can be expressed using the exemplary Contract Expression Language.

In the exemplary Contract Expression Language, a contract, for example, can include an agreement between two or more parties over a number of promises made by some parties. The nature of an agreement can include that a valid contract be signed by the parties involved. A promise can include several clauses, each of which can state a relationship, for example, such as when some parties acquire a right or permission to what the other grants, when some parties bind an obligation to what the other requires, when some parties follow a prohibition to what the other imposes, when some parties see an intention to what the other expresses, when some parties know an assertion to what the other makes, and the like.

A right or permission, an obligation and a prohibition can include the performance or the non-performance of some act or some class of acts. A difference among such terms can be the type of modality of an act that such terms address. For example, a right or permission can be of a type of modality that can be categorized by "may," an obligation can be categorized by "must," and a prohibition can be categorized by "must not." By contrast, an intention can include a desire to perform some act, and an assertion can describe a fact about the state of affairs as to whether or not some act was performed, is being performed, or will be performed. In an exemplary embodiment, the tense of an act need not be specified explicitly, as the tense often can be clear from the intention or assertion.

The relationship stated in a clause, for example, can be contingent on a condition to be true or on an event to occur, and the like. In an exemplary embodiment, the Principal-Act-Resource-Condition (PARC) model for XrML grants can be enhanced in the exemplary Contract Expression Language to an exemplary Event-Principal-Act-Resource-Condition (EPARC) model for such clauses. Advantageously, the exemplary EPARC model can include an event-condition-act rule paradigm and can be used in computer science and other applications, for example, including databases [27], expert systems [28], policy-based management [29], and the like.

The optional Event element, for example, can be used to capture the changes in a system context or environment that may entail the examination or execution of a clause. For example, the obligation clause can be triggered when the Event occurs, and if the Condition is true the Principal must perform the Act on the Resource. In an exemplary embodiment, the exemplary EPARC model, advantageously, can be employed for building relatively more efficient systems, for example, for managing contracts, consulting contracts, executing contracts, enforcing contracts, and the like.

In an exemplary embodiment, clauses also may be mutually dependent. For example, a mutual dependence can include that one clause depends on the validity of another clause, for example, such as "Alice has the right to sell a house, if she owns the house." Accordingly, the selling right clause depends on the validity of the ownership assertion clause.

In an exemplary embodiment, a mutual dependence can include that one clause depends on the performance of another clause, for example, such as "Alice has the obligation to sell her house, if Bob exercises his right to purchase the house by paying $500,000 by Apr. 30, 2002." Accordingly, the selling obligation clause depends on exercise of the purchase right clause.

In an exemplary embodiment, a mutual dependence can include that one clause depends on the non-performance of another clause, advantageously, which can be used to specify a remedy for a breach of the above contract, for example, such as "Bob must pay a penalty of $1,000 to Alice, if Bob does not make the payment of $500,000 to Alice by Apr. 30, 2002." Accordingly, the penalty obligation clause depends on the non-performance of the payment obligation clause.

In an exemplary embodiment, a contract can be specified as a dynamic object having a contracts lifecycle. The contracts lifecycle, for example, can include a creation phase, an execution or performance phase, an amendment, extension or renewal phase, a completion, termination or expiration phase, an archiving phase, and the like. In an exemplary embodiment, the creation phase, for example, can begin with an offer provided by some party or parties, followed by a number of rounds of consideration and negotiation, and finally resulting in an agreement signed by the parties involved. In an exemplary embodiment, the execution or performance phase, for example, can dictate that the parties involved exercise rights, fulfill obligations, obey prohibitions, contest intentions, verify assertions, and the like.

Advantageously, the exemplary Contract Expression Language distinguishes from other policy specification approaches [29] by employing features from XrML, for example, for supporting the contracts lifecycle, for providing trust management of contracts, and the like. For example, in an open environment, such as that of the Internet, interaction among the entities involved can entail a certain level of trust amongst the involved entities. However, policy management systems that support trust management typically deal with a trust relationship only among principals and resources.

For example, in a typical policy management system, a principal is trusted if the principal possesses a certificate issued by some authority, and a resource is trusted if the resource is digitally signed by a trusted principal. However, such policy management systems typically do not deal with trust relationship among policies.

For example, a fundamental assumption typically made by such policy management systems is that policies are made for administrative or security domains managed by the owners or administrators of the respective domains. Thus, such policies typically are limited to regulating the behaviors of entities within the domains.

By contrast, when a contract is to be executed in a distributed environment that can include many different administrative and security domains, typically it is not only necessary to understand what the contract conveys, but more importantly to understand in some authenticated manner the parties bound within the contract, the parties that authored the contract, the parties that agreed upon the contract, and the like. After all, such factors typically are what make a contract valid and enforceable in the first place. Otherwise, an unauthorized party, for example, can forge a contract and impose unauthorized obligations upon an unsuspecting party, can illegally empower others or the unauthorized by granting excessive permissions within the forged contract, can restrict others by demanding unauthorized prohibitions, can mislead others by making false claims within the forged contract, and the like.

Advantageously, the exemplary Contract Expression Language addresses the above and other problems, and, for example, enables the building of operational systems for content reference, provides an extensible architectural framework for specifying contracts for various other applications, such as applications outside of the content reference framework, and the like.

In an exemplary embodiment, the exemplary Contract Expression Language, advantageously, can be employed for specifying evidence of a contract. For example, the exemplary Contract Expression Language can employed for communicating information conveyed within a contract in manner that can be easily and unambiguously understood, and the like.

In an exemplary embodiment, the exemplary Contract Expression Language, advantageously, can be employed for specifying execution of a contract. For example, the exemplary Contract Expression Language can employed for facilitating permissive, obligatory or prohibitory performance within a contract in an appropriate context, for example, integrated with the business processes of the contracting parties, for determining whether or not a party is allowed to exercise some right or is required to fulfill some obligation or obey some prohibition of a contact, and the like.

In an exemplary embodiment, the exemplary Contract Expression Language, advantageously, can be employed for evaluation of a contract. For example, the exemplary Contract Expression Language can be employed for checking permissive, obligatory or prohibitory performance by contracting parties, and the like.

In an exemplary embodiment, the exemplary Contract Expression Language, advantageously, can be employed for facilitating formation of contracts. For example, the exemplary Contract Expression Language can be employed for automating processes related to an offer, an acceptance, an agreement, consideration, and the like.

In an exemplary embodiment, the exemplary Contract Expression Language, advantageously, can be employed for facilitating the dynamic generation and updating of contracts. For example, the exemplary Contract Expression Language can be employed for facilitating the negotiation of contracts, for supporting business models related to contracts, and the like.

In an exemplary embodiment, the exemplary Contract Expression Language, advantageously, can be employed for facilitating the enforcement of contracts. For example, the exemplary Contract Expression Language can be employed for enforcing rights granted by a contract, for mandating obligations and stipulated prohibitions of a contract, and the like.

In an exemplary embodiment, the exemplary Contract Expression Language can be used to specify the "may," "must" and "must not" types of modalities in terms of contract rights, obligations, prohibitions, and the like. The exemplary Contract Expression Language need not to specify the "may not act" type of modality explicitly, as such modality can be treated as a default modality. For example, if an act, for example, play, is not mentioned in a contract expression written in the exemplary Contract Expression Language, the default can be that everyone "may not act," for example, play, according to such a clause. In an exemplary embodiment, the "may not act" default can be applicable to a contract expression that does not mention the given act, as other contract expressions can be used to specify the given act as being permitted, being obligated, being prohibited, and the like.

Accordingly, an exemplary modality specification in the exemplary Contract Expression Language, for example, can include the following types:

"may act"—right or permission,
"must act"—obligation, and
"must not act"—prohibition.

Advantageously, the exemplary modalities can be consistent with deontic logic [24], which can include principles of reasoning with respect to permission, obligation, prohibition, and other normative matters. The exemplary Contract Expression Language, advantageously, also supports specifying the intention of performing an act and the assertion of an act being performed as a fact, for example, as given by:

"want to act"—intention, and
"acted," "is acting," "will act," "was," "is" and "will be"—assertion.

Advantageously, by employing such mechanisms for specifying intentions, the exemplary Contract Expression Language, for example, can be used to express queries to authorization agents or services in order to get responses as to whether or not the intended acts are permitted, obligated or forbidden, and the like. In addition, by employing the mechanisms for specifying intentions, the exemplary Contract Expression Language, for example, can be used to create attribute assertions and describe facts about the states of affairs or a context of a contract, for the purposes of, for example, issuing identity and attribute certificates, defining various policies, for example, for specifying preference and trust, keeping track of histories and states for contract performance, and the like.

The exemplary Contract Expression Language, advantageously, can support multi-lateral contracts, for example, that need more than one of the parties to agree upon, unilateral contracts, and the like. For example, an action to be taken in response to a content reference may depend not only on a multi-lateral contract, but also on applicable laws and regulations and "one-party" business rules. Advantageously, contracts expressed in the exemplary Contract Expression Language, for example, allow for the specification of one or more signers of a contract, one or more issuers of promises within a contract, and the like. For example, a contract expressed with the exemplary Contract Expression Language, advantageously, can be configured to specify that a first party is bound to the contract, if the first party has signed the contract or if the first party trusts the issuer of the contract, and the like.

The present invention includes the recognition that contracts play a very important role in electronic commerce, especially with business-to-business applications. Generally, such contracts incorporate definitions, such as descriptive claims, and rights and responsibilities, such as prescriptive rules, and set forth the obligations and authorizations of the parties to the contract. The present invention further includes the recognition that there can be legal complications and implications related to contracts. As an enabling technology, the exemplary Contract Expression Language need not be employed to define, prescribe, and supersede contracts that can be enforced by law [16] [17]. Advantageously, the exemplary Contract Expression Language can be employed to enable the theory of rights of Hohfeld [23] as applied to judicial reasoning.

The exemplary Contract Expression Language, for example, can be based on a rights expression language, such as XrML, and the like. For example, the exemplary Contract Expression Language can employ elements and types defined in XrML as building blocks, and the richness and the extensibility mechanisms of XrML expressions for providing expressiveness and extensibility to the exemplary Contract Expression Language. Advantageously, the exemplary Contract Expression Language can be interoperable and consistent with XrML. In addition, new constructs can be introduced, for example, for peer elements and types of the XrML counterparts, for containers of XrML constructs, for other new constructs, and the like.

In an exemplary embodiment, the exemplary Contract Expression Language can include a rights expression language, such as XrML, for rights or permissions, and additional features, such as obligations, prohibitions, intentions, assertions, and the like. Advantageously, the exemplary Contract Expression Language can be complementary to XrML. In addition, the exemplary embodiments, for example, can enable the offering, the generation, and the like, of XrML licenses based on exemplary Contract Expression Language contracts.

The exemplary Contract Expression Language can be defined as a declarative language. Advantageously, expressions written in the exemplary Contract Expression Language typically have no side effects. For example, the state of a system that uses the exemplary Contract Expression Language need not change because of evaluation of a Contract Expression Language expression.

Defining the exemplary Contract Expression Language as a declarative language provides a number of advantages over modeling the exemplary Contract Expression Language as an imperative language. For example, expressions based on the exemplary Contract Expression Language, such as grants, obligations, contracts, and the like, advantageously, can be independent of how the related rights are exercised, the related obligations are fulfilled, the related prohibitions are obeyed, the related contracts are adhered, and the like.

The exemplary Contract Expression Language, advantageously, can enable the development of business applications, systems, and the like. Advantageously, the exemplary Contract Expression Language can be employed by such business applications and systems as a means of expressing contractual agreements, as a means for managing expressions, and the like, for example, based on mechanisms for inserting, deleting, status-checking, enforcing, conflict detecting, conflict resolving, and the like, for contracts based on the exemplary Contract Expression Language.

In an exemplary embodiment, the exemplary Contract Expression Language need not decide how systems using the exemplary Contract Expression Language should change states thereof, for example, how values of expressions based on the exemplary Contract Expression Language will be changed. In an exemplary embodiment, when such expressions are evaluated, for example, for determining whether or not an action may or should be performed when associated conditions are satisfied, such determination can be regarded as one atomic action.

The exemplary embodiments can employ namespaces, for example, including schemas conforming to the W3C XML Schema [11], and the like. For example, eXtensible Markup Language (XML) namespace prefixes can be employed to stand for their respective namespaces as shown in Table 1, whether or not a namespace declaration is present in the listings of segments of the schema and examples.

TABLE 1

| Schema Namespaces | |
|---|---|
| Prefix | Namespace |
| c: (or omitted) | CEL Core namespace, http://www.xrml.org/schema/2002/04/celcore |
| csx: | CEL Standard Extension namespace, http://www.xrml.org/schema/2002/04/celsx |
| cpx: | CEL Content Distribution Extension namespace, http://www.xrml.org/schema/2002/04/celpx |
| r: | XrML Core namespace, http://www.xrml.org/schema/2001/11/xrml2core |
| sx: | XrML Standard Extension namespace, http://www.xrml.org/schema/2001/11/xrml2sx |
| cx: | XrML Content Extension namespace, http://www.xrml.org/schema/2001/11/xrml2cx |
| xsd: | W3C XML Schema namespace, http://www.w3.org/2001/XMLSchema [11] |
| dsig: | W3C XML Signature namespace, http://www.w3.org/2000/09/xmldsig# [12] |
| enc: | W3C XML Encryption namespace, http://www.w3.org/2001/04/xmlenc# [13] |

FIG. 2 illustrates an exemplary contract data model 200 of the exemplary Contract Expression Language that, for example, can be employed in the Digital Rights Management system of FIG. 1, and the like. In FIG. 2, the exemplary contract data model 200 can include a contract 202 having zero or more promises 208 agreed to by zero or more signers 210 of the contract 202. In an exemplary embodiment, the promise 208 can include one or more clauses 212, for example, used to describe a relationship among an event (E) 216, a principal (P) 218, an act (A) 220, a resource (R) 222, a condition (C) 224, and the like.

The contract 202, for example, further can include metadata 204, such as a title, status, an inventory of expressions used throughout the contract 202, and the like, one or more licenses 206, such as XrML licenses, and the like. In an exemplary embodiment, the presence of signatures of the one or more signers 210, for example, can be used in order to verify that the contract 202 is valid, can provide for contract integrity, can provide for signer authentication, can convey the consent of the signers 210, and the like. Advantageously, by signing the contract 202, the signers 210 can agree as to the contents of the contract 202. In addition, the corresponding signatures can serve as evidence for a decision that a user of the contract 202 may need to make as to whether or not the user can accept the signatures in the contract 202 for an applicable purpose of the contract 202 by the user.

In an exemplary embodiment, the promise 208 can include the clauses 212, optionally signed, and with each clause conveying a statement. In an exemplary embodiment, the corresponding signature for each clause can be used to indicate that that the issuer 214 corresponding to the signature conveyed the corresponding clause 212 within the promise 208. Advantageously, such signatures can serve as evidence for a decision that a user of the clauses 212 may need to make as to whether or not the user can trust the signatures so as to believe the content and authenticity carried in the clauses 212. For example, the issuer 214 element can be employed to conduct a process of issuance path validation for a chain of clauses in order to establish trust for an issuer of an end clause based on the trust of an issuer of a root clause in the clause chain.

In an exemplary embodiment, the clause 212 can be used to describe a statement about some kind of relationship among the elements of the clause 212, such as the event 216, the principal 218, the act 220, the resource 222, and the condition 224 elements. In an exemplary embodiment, the event 216, for example, can be an optional element representing an event condition. The event 216 can be satisfied if a corresponding event defined by the event 216 element occurs, for example, in a given context. In an exemplary embodiment, when the event 216 element is omitted from the corresponding contract 202, a default interpretation can be that no event is required to occur and hence the event condition is satisfied.

In an exemplary embodiment, the event 216, for example, can include an external event, an internal state, a temporal event, and the like. In an exemplary embodiment, an external event, for example, can be triggered by an entity outside a system bound by the corresponding contract 202, for example, such as when a user request for a content reference, and the like. In an exemplary embodiment, an internal event or a state event can be triggered by something that happens inside of a system bound by the corresponding contract 202, for example, such as when the number of printings allowed exceeding a limit, and the like. In an exemplary embodiment, a temporal event can be triggered when a point in time is reached, for example, such as when checking an invocation list at 1:00 am every day, and the like.

In an exemplary embodiment, the principal 218, for example, can be an optional element representing an entity or a set of entities that can perform an act specified by the act 220 element. In an exemplary embodiment, when the principal 218 is omitted from the corresponding contract 202, a default interpretation can be that any entity or the entire universe, for example, as a set of the entities, is being specified.

In an exemplary embodiment, the act 220 can include an act or a set of acts specified in the corresponding contract 202. In an exemplary embodiment, the semantics of an instantiation of the act 220 can be used to determine whether or not the corresponding act 220 employs the resource 222 element.

In an exemplary embodiment, the resource 222, for example, can be an optional element representing a resource or a set of resources that the corresponding act 220 applies to. In an exemplary embodiment, when the resource 222 is omitted from the corresponding contract 202, the default interpretation can be that no resource is specified, as compared to the entire universe of resources being specified by such omission.

In an exemplary embodiment, the condition 224, for example, can be an optional element representing a corresponding condition, subject to which the corresponding act 220 can be performed. In an exemplary embodiment, the condition 224 can be satisfied, if the corresponding condition the condition 224 specifies is met, for example, within a context. In an exemplary embodiment, when the condition 224 is omitted from the corresponding contract 202, the default interpretation can be that no condition or equivalently a condition that is always true is being specified.

The exemplary EPARC data model for the clause 212, advantageously, can be employed in computer science, and in the studies of programming languages, for example, such as for "if-guarded" and "while-guarded" commands in guarded commands [19], in database and knowledge-based systems, such as for event-condition-action rules [20] [21], in artificial intelligence, such as for "pattern-action" rules in production systems [22], in multi-agent systems [25] [26], and the like.

FIG. 3 illustrates exemplary clauses 212 that can be employed in the exemplary contract data model 200 of FIG. 2. In FIG. 3, the exemplary clauses 212, for example, can include one or more grant 320, duty 304, ban 306, claim 308, intent 310, and the like, elements. In an exemplary embodiment, advantageously, the grant 302 element, for example, can be employed to convey a right, a permission, and the like, the duty 304 element can be employed to impose an obligation, the ban 306 element can be employed to command a prohibition, the claim 308 element can be employed to declare an assertion, and the intent 310 element can be employed to express an intention.

For example, the exemplary clause 212 can be employed to define connotations, such as modal connotations, intentional connotations, factual connotations, and the like, among the event (E), the principal (P), the act (A), the resource (R) and the condition (C) elements 302-310, as follows:

Grant—(whenever E occurs), P may perform A upon R if C is met. Thus, (whenever E occurs), Grant conveys a permission on P to perform A on R in situations where C is met.

Duty—whenever E occurs, P must perform A upon R if C is met. Thus, whenever E occurs, Duty demands an obligation on P to perform A on R in situations where C is met.

Ban—whenever E occurs, P must not perform A upon R if C is met. Thus, whenever E occurs, Ban commends a prohibition on P not to perform A on R in situations where C is met.

Intent—whenever E occurs, P wants to perform A upon R if C is met. Thus, whenever E occurs, Intent expresses an intention of P to perform A on R in situations where C is met.

Claim—whenever E occurs, P does perform A upon R provided that C is met. Thus, whenever E occurs, Claim makes an assertion about P performing A on R in situations where C is met.

FIG. 4 illustrates an exemplary model of an eXtensible Rights Markup Language (XrML) grant 403 that can be defined using a PARC model, including a principal (P) 404 element, an act (A) 406 element, a resource (R) 408 element, and a condition (C) 410 element. Thus, an XrML grant can be specified with the clause 212 by omitting the event 216 element, for example, as given by:

Grant—P may perform A upon R if C is met. Thus, Grant conveys a permission on P to perform A on R in situations where C is met.

Advantageously, the EPARC model of the exemplary Contract Expression Language can be employed for expressing rights or permissions, as with the XrML grant, as well as for specifying obligations and prohibitions, for example, as given by:

"The distribution server must refer any music request to the www.someretailer.com."

Using the PARC model, the provisos of the above obligatory statement can be modeled by treating the provisos as conditions for the distribution server to fulfill the obligation of referring the request, for example, as given by:

(a) "the request being music," and
(b) "the reference destination being www.someretailer.com,"

However, treating the proviso (b) as a condition that must be met in order for the server to make the referral typically is not correct, as (b) is merely a constraint on the act of making a referral. For example, the act is making a referral to the destination www.someretailer.com. Moreover, making such a referral becomes an obligation for the server only when there is a request. For example, the referral has to be "triggered" by the event of an incoming request.

Advantageously, using the exemplary EPARC model, the referral service can be specified more precisely, for example, as given by:

"Upon the occurrence of a user request (E), it is obligatory that the distributor server (P) makes the referral to www.someretailer.com (A) of the request (R) if the request is a music request (C)."

The exemplary Contract Expression Language, for example, can employ XML Schema extensibility mechanisms, advantageously, enabling extensibility, Element substitution groups, Type substitution, "any" element, and the like [1] [11]. In an exemplary embodiment, the Extensible Element and Types shown in Table 2 provide additional elements and types that typically are not provided in XrML, but that, advantageously, are extensible in the exemplary Contract Expression Language.

TABLE 2

Extensible Elements and Types

| Element/Type | Extension Mechanism |
| --- | --- |
| Contract | "any" |
| Promise | Element substitution groups, Type substitution |
| Signer | Element substitution groups, Type substitution, "any" |
| Clause | Element substitution groups, Type substitution |
| Event | Element substitution groups, Type substitution |
| Principal | Element substitution groups, Type substitution |
| Act | Element substitution groups, Type substitution |
| Resource | Element substitution groups, Type substitution |
| Condition | Element substitution groups, Type substitution |

Such extensions to core elements of the exemplary Contract Expression Language can include definitions of elements and types for those concepts that are generally and broadly applicable to the exemplary Contract Expression Language usage scenarios. For example, there are composite elements shown in Table 3 that extend a corresponding element.

TABLE 3

Composite Clause Elements

| Element | Composite Element | Meaning |
| --- | --- | --- |
| Event | OnPerformance/[Clause, Claim1, . . . , ClaimN] | A Event, caused by performing the Act in the Clause, given the Claim1, . . . , ClaimN (as part of the context), where N ≥ 0. |
|  | AnyOneEvent/[E1, . . . , En] | A set of Events, including E1, . . . , En. This Event occurs if one and only one of E1, . . . , En occurs. |
| Principal | AllPrincipals/[P1, . . . , Pn] | A Principal representing the combination of all Principals P1, . . . , Pn. |
|  | AnyOnePrincipal/[P1, . . . , Pn] | A set of Principals P1, . . . , Pn. This Principal represents any one of those P1, . . . , Pn. |
|  | OnBehalfPrincipal/[P1, P2] | A Principal P1 acting on behalf of P2 [32]. |
| Act | AllActs/[A1, . . . , An] | An Act whose performance is the simultaneous performances of all A1, . . . , An. |
|  | AnyOneAct/[A1, . . . , An] | A set of Acts A1, . . . , An. This Act is performed if one and only one of A1, . . . , An is performed. |
| Resource | AllResources[R1, . . . , Rn] | A resource representing the combination of all R1, . . . , Rn. |
|  | AnyOneResource[R1, . . . , Rn] | A set of Resources P1, . . . , Pn. This Resource represents any one of those R1, . . . , Rn. |
| Condition | AllConditions[C1, . . . , Cn] | A Condition representing the conjunction of C1, . . . , Cn. |
|  | AnyConditions[C1, . . . , Cn] | A Condition representing the disjunction of C1, . . . , Cn. |

In an exemplary embodiment, there are a number of acts than can act as meta acts that act upon the corresponding clauses 212, for example, given by:

Issue: an Act, used to specify that a principal issues a clause (for example, within a contract). With the Issue Act, one can create specified clauses (for example, for permissions, obligations, prohibitions, intentions, and assertions) by making the Issue Act as an issuer of the clauses.

Obtain: an Act, used to specify that a principal obtains a clause (for example, within a contract). With the Obtain Act, one can receive a specified clause.

Revoke: an Act, used to specify that one revokes a clause by revoking one of its signatures as a signer or issuer. With the Revoke Act, one can invalidate an existing clause made by the signer or issuer.

Precede: an Act, used to specify that one clause precedes another in terms of preference. With the Precede Act, one can make claims for preference among clauses in order to resolve potential conflicts and multiplicities by the clause preference.

Possess: an Act, used to specify that a principal can possess some resource.

Trust: an Act, used to specify that one principal trusts one resource (for example, which can also be a principal) in terms of clauses made on the resource (or, for example, by the principal). With the Trust Act, one can make claims about what a principal trusts.

Bind: an Act, used to specify that one principal binds to one resource (for example, which can also be a principal) in terms of clauses made on the resource (or, for example, by the principal). With the Bind Act, one can make claims about what a principal binds to.

Delegate: an Act, used to specify that a first principal delegates some resource (for example, which can be Clauses) possibly to a second principal to act on behalf of the first principal.

In an exemplary embodiment, the exemplary Contract Expression Language can include one or more condition constructs related to past temporal operators [33], for example, given by:

Valid/[Clause, Claim1, ..., ClaimN]: The Valid condition is satisfied if the Event and Conditions of the Clause are valid under the assertions expressed in the Claim1, ..., ClaimN for example, (on top of the current context).

Exercised/[Clause, StateReference, Count]: The Exercised condition is satisfied if the Act specified in the Clause has been performed in Count times and the number of performance is recorded at the (for example, optional) StateReference. The Count is optional and when omitted defaults to one. Logically, the Exercised condition is true if the number stored at the StateReference is greater than or equal to Count.

NotExercised/[Clause, StateReference, Count]: The NotExercised condition is satisfied if the Act specified in the Clause has not been performed in Count times and the number of performance is recorded at the (for example, optional) StateReference. Logically, the NotExercised condition is true if the number stored at the StateReference is less than or equal to Count.

The exemplary Contract Expression Language can include a content distribution extension to the core elements, for example, that can be specific to content or resource publishing, distribution, and the like. The present invention includes the recognition that publishing and distribution contracts can be some of the most important documents involved in the publication and distribution process. For example, a publishing and distribution contract can be used to define the scope of the interests of an author and a publisher and govern respective rights and obligations of the parties, as well as the rights and obligations of heirs and successors of the parties, in the publication and distribution value chain.

In an exemplary embodiment, an exemplary semantics model for contracts based on the exemplary Contract Expression Language, for example, can include a mapping of a contract to one or more logic propositions, for example, Datalog programs [30], Prolog programs [31], which have well understood logic semantics, and the like. In an exemplary embodiment, the semantic mapping can be structural, can be defined based on the data model of a contract, and the like. Advantageously, the exemplary semantics model can serve as a foundation for further processing models.

In an exemplary embodiment, further semantics models can be employed, for example, based on advanced logic, such as deontic logic for the grant 302 element, for example, for a right or a permission, the duty 304 element, for example, an obligation, ought-to-be or ought-to-do, the ban 306 element, for example, a prohibition, and the like. In an exemplary embodiment, further semantics models can be employed, for example, based on dynamic logic for the act 220 element, for example, actions, and the like. In an exemplary embodiment, further semantics models can be employed, for example, based on doxastic logic for the issuer 214 and the signer 210 elements, for example, so that trust and binding relationships can be specified. In an exemplary embodiment, further semantics models can be employed, for example, based on temporal logic for performance and non-performance of the act 220 elements, for example, so that a remedy and a warranty can be specified.

In an exemplary embodiment, the notation employed for the exemplary Contract Expression Language, for example, can be given by:

For any contract element Z within a Contract, denote by Z/[Z1, ..., Zm] the fact that Z has m elements Z1, ..., Zm, and by Z@[A1, ..., Al] the fact that Z has n attributes A1, ..., An.

Let Z be any contract element of a Contract. Denote by [[Z]] the semantics of Z, which is a set of logic propositions possibly with universally qualified variables (for example, Horn clauses [31]).

Let π be the set of all Datalog type propositions. For each proposition Q of the form Q0←Q1, ..., Qm (m≥0), denote by Head(Q) (=Q0) the conclusion of Q, and by Body(Q) (=Q1, ..., Qm) the hypothesis of Q.

In an exemplary embodiment, the semantics of the contract 202, for example, can be given by:

For a Contract expression E of the form E/[D, P1, ..., PM, S1, ..., SK], where D is the Metadata, P1, ..., PM, 0≤M, are the Promises and S1, ..., SK, 0≤K, are the Signers within E:

Let Slist=[S1, ..., SK].

In an exemplary embodiment, the semantics [[E]] of the contract 202 expression (E), for example, can be given by:

$$[[E]]=\{Metadata(E,D)\}\cup[[P1]](Slist)\cup \ldots \cup[[PM]](Slist)\cup[[S1]](E)\cup \ldots \cup[[SK]](E)\cup\{PromiseOf(P1,E)\}\cup \ldots \cup\{PromiseOf(PM,E)\}$$

In an exemplary embodiment, the semantics of the contract 202 expression E, for example, can include propositions declaring the promises (P1, ..., PM) signed by the signers 210 from the Slist, and the semantics of the signers 210 (S1, ..., SK) of the Slist for the contract 202 expression E. The semantics of the contract 202 expression E also can include the fact that each of the promises (P1, ..., PM) is part of the promise 208 of the contract 202 expression E.

In an exemplary embodiment, the semantics of the promise 208, for example, can be given by:

Let P be a Promise of the form P/[C1, ..., CN, I1, ..., IL], where C1, ..., CN, 1≤N, are the Clauses and I1, ..., IL, 0≤L are the Issuers within P.

Let Ilist=[I1, ..., IL] and Slist be the list of Signers who sign the Contract directly including the Promise P.

In an exemplary embodiment, the semantics $[[P]]$ of the promise (P) 208, for example, can be given by:

$[[P]](Slist)=[[C1]](Ilist,Slist) \cup ... \cup [[CN]](Ilist, Slist) \cup [[I1]](P) \cup ... \cup [[IL]](P) \cup \{ClauseOf(C1,P)\} \cup ... \cup \{ClauseOf(CN,P)\}$.

In an exemplary embodiment, given a list of the signers 210, the semantics of the promise (P) 208, for example, can include propositions declaring the clauses (C1, CN) issued by the issuers 214 from Ilist, signed by the signers 210 from the Slist, and the semantics of the issuers 214 (I1, ..., IL) for the promise (P) 208. The semantics of the promise (P) 208 also can include the fact that each of the clauses (C1, ..., CN) is part of the clause 212 of the promise 208 (P).

In an exemplary embodiment, the semantics of the signer 210, for example, can be given by:

Let S be a Signer. The semantics $[[S]]$ of S is a mapping of a Contract expression E signed by S to π, such that $[[S]](E)$ is a set of propositions, some of which have the head Signing(E, S), attesting whether or not the Signer S is indeed a signer of E. The set may include propositions to verify any digital signature of S upon E.

In an exemplary embodiment, the semantics of a clause, for example, can be given by:

Let C be a Clause of the form C/[E, P, A, R, C]. Let Ilist be the list of Issuers who issue the Promise directly including C and Slist be the list of Signers who sign the Contract directly including the Promise that directly includes the clause C.

In an exemplary embodiment, the semantics $[[C]]$ of the clause (C) 212, for example, can be given by:

$[[C]](Ilist,Slist)=\{Clause(E,P,A,R,C,Ilist,Slist).\} \cup [[E]] \cup [[P]] \cup [[A]] \cup [[R]] \cup [[C]]$.

In an exemplary embodiment, given the list of the issuers 214 (Ilist) and the list of the signers 210 (Slist), the semantics of the clause 212, for example, can include a proposition declaring that semantics of the clause 212 is a clause including of the event (E) 216, the principal (P) 218, the act (A) 220, the resource (R) 222, the condition (C) 224, a list of the issuers 214 (Ilist), and the list of the signers 210 (Slist). The semantics of the clause 212 also can include the semantics of the elements E, P, A, R and C.

In an exemplary embodiment, the semantics of the grant 302, the duty 304, the ban 306, the claim 308, and the intent 310 elements for the clauses 212 can include propositions, instead of Clause(E, P, A, R, C, Ilist, Slist), for example, as given by:

Grant(E, P, A, R, C, Ilist, Slist).
Duty(E, P, A, R, C, Ilist, Slist).
Ban(E, P, A, R, C, Ilist, Slist).
Claim(E, P, A, R, C, Ilist, Slist).
Intent(E, P, A, R, C, Ilist, Slist).

In an exemplary embodiment, the semantics of the issuer 214, for example, can be given by:

Let I be an Issuer. Its semantics $[[I]]$ is a mapping of a Promise P it issues to π, such that $[[I]](P)$ is a set of propositions, some of which have the head Issuing(P, I), attesting whether or not the Issuer I is indeed an issuer of P. The set may include propositions to verify any digital signature of I upon P.

In an exemplary embodiment, the event (E) 216 clause elements, for example, can include a condition. In an exemplary embodiment, the semantics $[[E]]$ of the event 216 condition, for example, can be given by:

---

If E is an instance Event, then
  $[[E]] = e[[E]]$,
where $e[[ ]]$ is a mapping of instance Events to π, such that for each instance Event E, $e[[E]]$ is a set of propositions, some of which have the head Event(E), attesting whether or not the Event E occurs.
If E = OnPerformance/[Clause/[E, P, A, R, C], Claim1, ..., ClaimN], then
  $[[E]] = \{Event(E) \leftarrow Claim(E, P, A, R, C, Ilist, Slist),$
    $Claim(E1, P1, A1, R1, C1, Ilist1, Slist1), ...$
    $Claim(EN, PN, AN, RN, CN, IlistN, SlistN). \} \cup$
  $[[Claim1]] \cup ... \cup [[ClaimN]]$.
If E = AllEvents/[E1, ..., En], then
  $[[E]] = \{Event(E) \leftarrow Event(E1), ..., Event(En).\} \cup$
  $[[E1]] \cup ... \cup [[En]]$.
If E = AnyOneEvent/[E1, ..., En], then
  $[[E]] = \{Event(E) \leftarrow Event(E1).\} \cup ... \cup \{Event(E) \leftarrow Event(En).\} \cup$
  $[[E1]] \cup ... \cup [[En]]$.
If E is empty (or omitted), then $[[E]] = \{ Event([ ]). \}$. For example, this condition is always met.

---

In an exemplary embodiment, the principal (P) 218, for example, can be a single entity, a set of entities, and the like. In an exemplary embodiment, the semantics $[[P]]$ of the principal 218, for example, can be given by:

---

If P is an instance Principal, then
  $[[P]] = p[[P]]$,
where $p[[ ]]$ is a mapping of instance Principals to π, such that for each instance Principal P, $p[[P]]$ is a set of propositions, some of which have the head MatchP(X, P), attesting whether or not the input X matches against the Principal P. For example, if P is the XrML KeyHolder principal, its semantics includes the proposition MatchP(X, P) ← X = P, for example, X matches against P if X as an XML expression is "syntactically" equal to P (for example, subject to some XML canonicalization).
If P = AllPrincipals/[P1, ..., Pn], then
  $[[P]] = \{MatchP(X, P) \leftarrow MatchP(X, P1), ..., MatchP(X, Pn).\} \cup$
  $[[P1]] \cup ... \cup [[Pn]]$.
If P = AnyOnePrincipal/[P1, ..., Pn], then
  $[[P]] = \{MatchP(X, P) \leftarrow MatchP(X, P1).\} \cup ... \cup$
  $\{MatchP(X, P) \leftarrow MatchP(X, Pn).\} \cup$
  $[[P1]] \cup ... \cup [[Pn]]$.
If P = OnBehalfPrincipal/[p1, p2], then
  $[[P]] = \{MatchP(X, P) \leftarrow MatchP(X, P1),$
    $Claim(E, P1, delegate, P2, C),$
    $Event(E), Cond(C).\} \cup$
  $[[P1]] \cup [[P2]]$.
If P is empty (or, for example, omitted), then $[[P]] = \{ MatchP(X, [ ]). \}$. For example, the input X matches against any Principal.

---

In an exemplary embodiment, the act (A) 220, for example, can include a single act, a set of acts, and the like. In an exemplary embodiment, the semantics $[[A]]$ of the act 220, for example, can be given by:

---

If A is an instance Act, then
  $[[A]] = a[[A]]$,
where $a[[ ]]$ is a mapping of instance Acts to π, such that for each instance Act A, $a[[A]]$ is a set of propositions, some of which have the head MatchA(X, A), attesting whether or not the input X matches against the Act A. For example, for the XML Play act, its semantics includes the proposition MatchA(X, A) ← X = A. In general, the semantics of Play also may include propositions that match more restrictive version of Play (for example, such as PlaySilent - play with no audio output) against Play.

-continued

```
If A = AllActs/[A1, ..., An], then
    [[A]] = {MatchA(X, A) ← MatchA(X, A1), ..., MatchA(X, An).} ∪
    [[A1]] ∪ ... ∪ [[An]].
If A = AnyOneAct/[A1, ..., An], then
    [[A]] = {MatchA(X, A) ← MatchA(X, A1).} ∪ ... ∪
    {MatchA(X, A) ← MatchA(X, An).} ∪
    [[A1]] ∪ ... ∪ [[An]].
```

In an exemplary embodiment, the resource (R) 222, for example, can include a single resource, a set of resources, and the like. In an exemplary embodiment, the semantics [[R]] of the resource 222, for example, can be given by:

```
If R is an instance Resource, then
    [[R]] = r[[R]],
where r[[ ]] is a mapping of instance Resources to Π, such that for
each instance Resource R, r[[R]] is a set of propositions, some of
which have the head MatchR(X, R), attesting whether or not the input
X matches against the Resource R.
If R = AllResources/[R1, ..., Rn], then
    [[R]] = {MatchR(X, R) ← MatchR(X, R1), ..., MatchR(X, Rn).} ∪
    [[R1]] ∪ ... ∪ [[Rn]].
If R = AnyOneResource/[R1, ..., Rn], then
    [[R]] = {MatchR(X, R) ← MatchR(X, R1).} ∪ ... ∪
    {MatchR(X, R) ← MatchR(X, Rn).} ∪
    [[R1]] ∪ ... ∪ [[Rn]].
If R is empty (or omitted), then [[R]] = { MatchR(X, [ ]) ← false. }. For
example, the input X does match against any Resource.
```

In an exemplary embodiment, the condition (C) 224 specifies a condition, wherein the semantics [[C]] of the condition 224, for example, can be given by:

```
If C is an instance Condition, then
    [[C]] = c[[C]],
where c[[ ]] is a mapping of instance Conditions to Π, such that
for each instance Condition C, c[[C]] is a set of propositions, some of
which have the head Cond(C), attesting whether or not the Condition C
is met.
If C = AllConditions/[C1, . . . , Cn], then
    [[C]] = {Cond(C) ← Cond(C1), . . . , Cond(Cn).} ∪
    [[C1]] ∪ . . . ∪[[Cn]].
If C = AnyOneCondition/[C1, . . . , Cn], then
    [[C]] = {Cond(C) ← Cond(C1).} ∪ . . . ∪{Cond(C) :- Cond(Cn).} ∪
    [[C1]] ∪ . . . ∪[[Cn]].
If C is empty (or omitted), then [[C]] = { Cond([ ]). }. For example,
this condition is always met.
```

The following exemplary contracts, obligations, prohibitions, intentions, assertions, and the like, help to illustrate the expressiveness of the exemplary Contract Expression Language. Advantageously, the exemplary embodiments, for example, allow for the expressing of exclusivity, allow for the expressing preference to help resolving potential conflicts and multiplicities, allow for the expressing trust and binding policies, and the like.

In an exemplary embodiment, a Web service referral, for example, can be given by:

"The distribution server must refer any music request to the www.someretader.com."

The exemplary Web service referral can be expressed using the exemplary Contract Expression Language, for example, by employing an extension, "refx," for the referral extension, that defines the event 216 element, "receiveCR," the act 220 element, "redirect," with the constraint element, "redirectTo," the resource 222 element, "request," and the condition 224 element, "requestConstraint," for example, as given by:

```
<contract>
  <promise>
    <duty>
      <refx:receiveCR/>
      + <r:keyHolder licensePartId="DistributionServer">
      <refx:redirect>
        <refx:redirectTo>
          <r:serviceReference>
            <r:uddi>
              <serviceKey>
                <uuid>12345678-1234-1234-1234-123456789abc</uuid>
              </serviceKey>
            </r:uddi>
            <r:serviceParameters>
              <r:datum>
                <website url="www.someretailer.com"/>
              </r:datum>
              <r:datum>
                <refx:request licensePartIdRef="CR"/>
              </r:datum>
            </r:serviceParameters>
          </r:serviceReference>
        </refx:redirectTo>
      </refx:redirect>
      <refx:request licensePartId="CR"/>
      <refx:requestConstraint>
        <r:xmlExpression>./TYPE="music"
        </r:xmlExpression>
      </refx:requestConstraint>
    </duty>
  <promise>
  signer licensePartId="publisher">
    +<dsig:Signature>
    <details>
      <timeOfIssue>2001-11-11T11:11:11</timeOfIssue>
    </details>
  </signer>
  <signer licensePartId="distributor">
    + <dsig:Signature>
    <details>
      <timeOfIssue>2001-11-11T11:11:11</timeOfIssue>
    </details>
  </signer>
</contract>
```

In an exemplary embodiment, a goods-for-sale, for example, can be given by:

"Alice must sell her house to Bob if he pays her $500,000."

The exemplary goods-for-sale can be expressed using the exemplary Contract Expression Language, for example, by employing an extension "rex," for the real estate extension, that defines the event 216 element, "receivePayment," the act 220 element, "sell" with the constraint "sellTo" and the resource 222 element, "property," for example, as given by:

```
<contract>
  <promise>
    <duty>
      <rex:receivePayment>
        <sx:paymentFlat>
          <sx:rate currencyCode="USD">500000</sx:rate>
        </sx:paymentFlat>
        <sx:to>
          <!-- Alice's bank account -->
          <sx:aba>
            <sx:institute>123456789</sx:institute>
            <sx:account>0987654321</sx:account>
          </sx:aba>
        </sx:to>
      </rex:receivePayment>
      + <r:keyHolder licensePartId="Alice">
      <rex:sell>
```

```
                <rex:sellTo>
                    + <r:keyHolder licensePartId="Bob">
                </rex:sellTo>
            </rex:sell>
            <rex:property licensePartId="AliceHouse">
                <rex:location>
                    <rex:address>SOME ADDRESS</rex:address>
                </rex:location>
            </rex:property>
        </duty>
    <promise>
    <signer licensePartId="Alice">
        + <dsig:Signature>
        <details>
            <timeOfIssue>2001-11-11T11:11:11</timeOfIssue>
        </details>
    </signer>
    <signer licensePartId="Bob">
        + <dsig:Signature>
        <details>
            <timeOfIssue>2001-11-11T11:11:11</timeOfIssue>
        </details>
    </signer>
</contract>
```

In an exemplary embodiment, a portion of a monthly apartment rental contract, for example, can be given by:

"On the first day of a month during the validity time of the contract, Alice must pay Bob $600 for renting the apartment. If Alice fails to make the payment, Bob has the right to evict her from the apartment."

In an exemplary embodiment, a contract can be established based on the above expression and, for example, can include:

duty: Alice must pay Bob $600 on the first day of every month, since Jan. 1, 2001.

duty: Bob must allow Alice to live in the apartment every month she pays the rent.

grant: Alice may live in the apartment every month she pays the rent.

grant: Bob may evict Alice if she does not pay the rent (for example, breaches the payment obligation).

The exemplary portion of a monthly apartment rental contract can be expressed using the exemplary Contract Expression Language, for example, as given by:

```
<contract>
    <promise>
        <duty>
            <sx:validityTimePeriodic>
                <sx:start>2001-01-01T00:00:00</sx:start>
                <sx:period>P1M</sx:period>
                <sx:duration>P1D</sx:duration>
            </sx:validityTimePeriodic>
            + <r:keyHolder licensePartId="Alice">
            <rex:pay>
                <sx:validityTimePeriodic>
                    <sx:duration>P1D</sx:duration>
                </sx:validityTimePeriodic>
            </rex:pay>
            <rex:fee>
                <sx:paymentFlat>
                    <sx:rate currencyCode="USD">1000</sx:rate>
                </sx:paymentFlat>
                <sx:to>
                    <!--Bob's bank account -->
                    <sx:aba>
                        <sx:institute>123456789</sx:institute>
                        <sx:account>0987654321</sx:account>
                    </sx:aba>
                </sx:to>
            </rex:fee>
        </duty>
        <duty>
            + <r:keyHolder licensePartId="Bob">
            <rex:rent/>
            <rex:property licensePartId="Apartment">
                <rex:location>
                    <rex:address>SOME ADDRESS</rex:address>
                </rex:location>
            </rex:property>
            <r:allConditions>
                <fulfillingObligation licensePartId="AlicePays">
                    <r:keyHolder licensePartIdRef="Alice"/>
                    <rex:pay/>
                    <rex:fee>
                        <sx:paymentFlat>
                            <sx:rate currencyCode="USD">1000</sx:rate>
                        </sx:paymentFlat>
                        <sx:to>
                            <!-- Bob's bank account -->
                            <sx:aba>
                                <sx:institute>123456789</sx:institute>
                                <sx:account>0987654321</sx:account>
                            </sx:aba>
                        </sx:to>
                    </rex:fee>
                    <sx:validityTimePeriodic>
                        <sx:start>2001-01-01T00:00:00</sx:start>
                        <sx:period>P1M</sx:period>
                        <sx:duration>P1D</sx:duration>
                    </sx:validityTimePeriodic>
                </fulfillingObligation>
                <rex:rentTo>
                    <r:keyHolder licensePartIdRef="Alice"/>
                </rex:rentTo>
            </r:allConditions>
        </duty>
        <grant>
            <r:keyHolder licensePartIdRef="Alice"/>
            <rex:liveIn/>
            <rex:property licensePartIdRef="Apartment"/>
            <fulfillingObligation licensePartIdRef="AlicePays"/>
        </grant>
        <grant>
            <r:keyHolder/>
            <rex:evacuate/>
            <r:keyHolder/>
            <r:allConditions>
                <breachingObligation>
                    <r:keyHolder licensePartIdRef="Alice"/>
                    <rex:pay/>
                    <rex:fee>
                        <sx:paymentFlat>
                            <sx:rate currencyCode="USD">1000</sx:rate>
                        </sx:paymentFlat>
                        <sx:to>
                            <!-- Bob's bank account -->
                            <sx:aba>
                                <sx:institute>123456789</sx:institute>
                                <sx:account>0987654321</sx:account>
                            </sx:aba>
                        </sx:to>
                    </rex:fee>
                    <sx:validityTimePeriodic>
                        <sx:start>2001-01-01T00:00:00</sx:start>
                        <sx:period>P1M</sx:period>
                        <sx:duration>P1D</sx:duration>
                    </sx:validityTimePeriodic>
                </breachingObligation>
                <rex:evacuateFrom>
                    <rex:property licensePartIdRef="Apartment"/>
                </rex:evacuateFrom>
            </r:allConditions>
        </grant>
    </promise>
    <signer licensePartId="Alice">
        + <dsig:Signature>
        <details>
```

```
            <timeOfIssue>2000-11-11T11:11:11</timeOfIssue>
        </details>
    </signer>
    <signer licensePartId="Bob">
        + <dsig:Signature>
        <details>
            <timeOfIssue>2000-11-11T11:11:11</timeOfIssue>
        </details>
    </signer>
</contract>
```

In an exemplary embodiment, an obligation that an online retailer must pay transmission charge, for example, can be given by:

"Yahoo! must pay 0.05 of receipts to AT&T for all sales that meet the criteria, 1) product is e-book, and 2) billing address of customer is in US."

Accordingly, it is obligated that, in the event of any sale transaction conducted by Yahoo!, Yahoo! pays to AT&T 0.05 of the receipts, when the product is an e-book and billing address of customer is in the U.S. The exemplary obligation duty can be expressed using the exemplary Contract Expression Language, for example, as given by:

```
<duty>
    <umg:saleTransactionEventAtYahoo licensePartId="sale"/>
    <cpx:company>Yahoo!</cpx:company>
    <cpx:pay/>
        <cx:destination>
            <!-- AT&T as a key holder -->
            <r:keyHolder> ... </r:keyHolder/>
        </cx:destination>
    </cpx:pay>
    <csx:transactionMarkupPayment>
    <cx:rate>0.05</cx:rate>
        <umg:saleTransactionEventAtYahoo licensePartIdRef="sale"/>
    </csx:transactionMarkupPayment>
    <r:allConditions>
    <umg:transactionProductType>e-book</umg:transactionProductType>
    <umg:transactionBillingAddress>
        <sx:country>US</sx:country>
    </umg:transactionBillingAddress>
    </r:allConditions>
</duty>
```

In an exemplary embodiment, a certification duty, for example, can be given by:

"Each revision of media player must be submitted, via HREV, to Haxor, Inc."

Accordingly, it is obligatory that, in the event of releasing a revision of media player, Microsoft submits the media player to Haxor, Inc., using the HREV protocol. Alternatively, Haxor, Inc., can be treated as a certification service and communication with the service is via the HREV protocol. The exemplary certification duty can be expressed using the exemplary Contract Expression Language, for example, as given by:

```
<duty>
    <!--Define a variable for any revision of the media player
    released by Microsoft-->
    <forAll varName="mediaPlayer">
    <xmlExpression>//mpeg21:DIDL/mpeg21:ITEM/mpeg21:
    DESCRIPTOR/mpeg21:STATEMENT/mpeg7/mpeg7:Mpeg7/mpeg7:
    DescriptionUnit/mpeg7:Creation/mpeg7:Creator[mpeg7:
    Role/@href="urn:mpeg:mpeg7:cs:MPEG7RoleCS:
    PUBLISHER"]/mpeg7:Organization/mpeg7:Name=
    "Microsoft" && //mpeg21:DIDL/mpeg21:ITEM/mpeg21:
    DESCRIPTOR/mpeg21:STATEMENT/mpeg7/mpeg7:Mpeg7/mpeg7:
    DescriptionUnit/mpeg7:Creation/mpeg7:Title=
    "Media Player"
    </xmlExpression>
    </forAll>
    <umg:eventOfProductReleasingByMicrosoft/>
    <r:resource varRef="mediaPlayer"/>
    </umg:eventOfProductReleasingByMicrosoft>
    <!-- Microsoft as a key holder -->
    <r:keyHolder> ... </r:keyHolder/>
    <cx:copy/>
    <cx:destination>
    <!-- Haxor as a key holder -->
    <r:keyHolder> ... </r:keyHolder/>
    </cx:destination>
    <cpx:protocol>
    HREV
    </cpx:protocol>
    </cx:copy>
    <r:resource varRef="mediaPlayer"/>
</duty>
```

In an exemplary embodiment, a referral duty, for example, can be given by:

"Any referral requested by a consumer currently in Japan must be redirected to NTT's reference service for resolution."

Accordingly, "in Japan" can be defined by the location of the requestor at the time of the request, and any referral request from a consumer currently in Japan must be redirected to NTT's reference service." The exemplary referral duty can be expressed using the exemplary Contract Expression Language, for example, as given by:

```
<duty>
    <refx:receiveCR/>
    + <r:keyHolder licensePartId="DistributionServer">
    <refx:redirect>
        <refx:redirectTo>
            <r:serviceReference licensePartId="NTTReferenceService">
                <r:uddi>
                    <serviceKey>
                        <uuid>12345678-1234-1234-1234-
    123456789abc</uuid>
                    </serviceKey>
                </r:uddi>
                <r:serviceParameters>
                    <r:datum>
                    <refx:request licensePartIdRef="CR"/>
                    </r:datum>
                </r:serviceParameters>
            </r:serviceReference>
        </refx:redirectTo>
    </refx:redirect>
    <refx:request licensePartId="CR"/>
    <refx:requestConstraint>
        <cx:territory>
            <cx:location>
                <cx:country>JP</cx:country>
            </cx:location>
        </cx:territory>
    </refx:requestConstraint>
</duty>
```

In an exemplary embodiment, a rendering device can be prohibited or banned, for example, as given by:

"The Z45 is prohibited from playing any UMG content."

The above exemplary prohibition or ban, for example, can be given by:

It is forbidden that anyone plays any UMG content, when the renderer is the device Z45.

The above exemplary prohibition or ban can be expressed using the exemplary Contract Expression Language, for example, as given by:

```
<ban>
    <!--Define a variable for any content published by UMG-->
    <forAll varName="UMGContent">
    <xmlExpression>//mpeg21:DIDL/mpeg21:ITEM/mpeg21:
    DESCRIPTOR/mpeg21:STATEMENT/mpeg7:Mpeg7/mpeg7:
    DescriptionUnit/mpeg7:Creation/mpeg7:Creator[mpeg7:
    Role/@href="urn:mpeg:mpeg7:cs:MPEG7RoleCS:
    PUBLISHER"]/mpeg7:Organization/mpeg7:Name=
    "UMG"</xmlExpression>
    </forAll>
    <cx:play/>
    <r:resource varRef="UMGContent"/>
    <cx:renderer>
        <cpx:device type="Z45"/>
    </cx:renderer>
</ban>
```

The exemplary prohibition or ban, for example, also can be given by:

It is forbidden that anyone uses the rendering device Z45 to play any UMG content.

The above exemplary prohibition or ban can be expressed using the exemplary Contract Expression Language, for example, as given by:

```
<ban>
    <!--Define a variable for any content published by UMG-->
    <forAll varName="UMGContent">
    <xmlExpression>//mpeg21:DIDL/mpeg21:ITEM/mpeg21:
    DESCRIPTOR/mpeg21:STATEMENT/mpeg7:Mpeg7/mpeg7:
    DescriptionUnit/mpeg7:Creation/mpeg7:Creator [mpeg7:
    Role/@href="urn:mpeg:mpeg7:cs:MPEG7RoleCS:
    PUBLISHER"]/mpeg7:Organization/mpeg7:Name=
    "UMG"</xmlExpression>
    </forAll>
    <cx:play>
        <cx:renderer>
            <cpx:device type="Z45"/>
        </cx:renderer>
    </cx:play>
    <r:resource varRef="UMGContent"/>
</ban>
```

In an exemplary embodiment, sales of a class of content in a country can be prohibited or banned, for example, as given by:

"Sales of R-rated movies where buyer is currently located in Finland are prohibited."

The above exemplary prohibition or ban, for example, can be given by:

It is forbidden that anyone in Finland obtains any R-rated movie.

The above exemplary prohibition or ban can be expressed using the exemplary Contract Expression Language, for example, as given by:

```
<ban>
    <!--Define a variable for any R-rated movie-->
    <forAll varName="R-RatedMovie">
    <xmlExpression>//mpeg21:DIDL/mpeg21:ITEM/mpeg21:
    DESCRIPTOR/mpeg21:STATEMENT/mpaa:rate=
    "R"</xmlExpression>
    </forAll>
    <r:obtain/>
    <r:resource varRef="R-RatedMovie"/>
    <sx:territory>
        <sx:location>
            <sx:country>FI</sx:country>
        </sx:location>
    </sx:territory>
</ban>
```

The above exemplary prohibition or ban, for example, also can be given by:

It is forbidden that anyone sells to anyone in Finland any R-rated movie.

The above exemplary prohibition or ban can be expressed using the exemplary Contract Expression Language, for example, as given by:

```
<ban>
    <!--Define a variable for any R-rated movie-->
    <forAll varName="R-RatedMovie">
    <xmlExpression>//mpeg21:DIDL/mpeg21:ITEM/mpeg21:
    DESCRIPTOR/mpeg21:STATEMENT/mpaa:rate=
    "R"</xmlExpression>
    </forAll>
    <cpx:sell>
        <cpx:buyer>
            <sx:location>
                <sx:country>FI</sx:country>
            </sx:location>
        </cpx:buyer>
    </cpx:sell>
    <r:resource varRef="R-RatedMovie"/>
</ban>
```

In an exemplary embodiment, encoding can be prohibited or banned, for example, as given by:

"UMG content classified "Top-40" must never be encoded at greater than 8 bits resolution."

Accordingly, it is forbidden that anyone encodes at greater than 8 bits resolution any UMG content, when the content is in the top 40 list. The exemplary prohibition or ban can be expressed using the exemplary Contract Expression Language, for example, as given by:

```
<ban>
    <!--Define a variable for any content published by UMG-->
    <forAll varName="UMGContent">
    <xmlExpression>//mpeg21:DIDL/mpeg21:ITEM/mpeg21:
    DESCRIPTOR/mpeg21:STATEMENT/mpeg7:Mpeg7/mpeg7:
    DescriptionUnit/mpeg7:Creation/mpeg7:Creator [mpeg7:
    Role/@href="urn:mpeg:mpeg7:cs:MPEG7RoleCS:
    PUBLISHER"]/mpeg7:Organization/mpeg7:Name=
    "UMG"</xmlExpression>
    </forAll>
    <cpx:encode/>
        <!-- It is assumed that resolution range is specified
    as 8, 12, 8-12 ([8, 12]), -12 (<=12), 8- (>=8) -->
        <cx:resolutionRange unit="bit">8-</cpx:resolutionRange>
    </cpx:encode>
    <r:resource varRef="UMGContent"/>
    <umg:top40Content/>
</ban>
```

In an exemplary embodiment, an intention play a song using a rendering application, for example, can given by:

"Alice wants to play any UMG content using the Microsoft media player."

Accordingly, it is intended that Alice plays any UMG content, using Microsoft media player as the rendering application. The exemplary intent can be expressed using the exemplary Contract Expression Language, for example, as given by:

```
<intent>
    <!--Define a variable for any content published by UMG-->
    <forAll varName="UMGContent">
<xmlExpression>//mpeg21:DIDL/mpeg21:ITEM/mpeg21:
DESCRIPTOR/mpeg21:STATEMENT/mpeg7:Mpeg7/mpeg7:
DescriptionUnit/mpeg7:Creation/mpeg7:Creator[mpeg7:
Role/@href="urn:mpeg:mpeg7:cs:MPEG7RoleCS:
PUBLISHER"]/mpeg7:Organization/mpeg7:Name=
"UMG"</xmlExpression>
    </forAll>
    + <r:keyHolder licensePartId="Alice">
    <cx:play>
        <cx:renderer>
    <cpx:application type="Microsoft Media Player"/>
    </cx:renderer>
    </cx:play>
    <r:resource varRef="UMGContent"/>
</intent>
```

In an exemplary embodiment, a certificate, for example, can given by:

"The key holder has the name Alice."

Accordingly, it is claimed that the key holder possesses the name attribute with value Alice. The exemplary claim can be expressed using the exemplary Contract Expression Language, for example, as given by:

```
<claim>
    + <r:keyHolder licensePartId="Alice">
    <cxs:possess/>
    <sx:commonName>Alice</sx:commonName>
</claim>
```

In an exemplary embodiment, a usage state, for example, can given by:

"Alice played the song in the year 2001."

Accordingly, it is claimed that Alice played the song from Jan. 1 to Dec. 31, 2001. The exemplary claim can be expressed using the exemplary Contract Expression Language, for example, as given by:

```
<claim>
    + <r:keyHolder licensePartId="Alice">
    <cx:play/>
    <r:resource licenseIdRef="aSong"/>
    <validityInterval>
        <notBefore>2001-01-01T00:00:00</notBefore>
        <notAfter>2001-12-31T23:59:59</notAfter>
    </validityInterval>
</claim>
```

In an exemplary embodiment, the exemplary Contract Expression Language can be used to specify a contract clause, for example, in a mutually exclusive manner, in a manner that does not allow anything else to happen, and the like. For example, the exemplary Contract Expression Language can be used to express a contract that can specify that someone has an exclusive right to publish a digital work, and a guest user, such as non-registered guest user, can only browse a public area of the corresponding Web site.

In the exemplary embodiments, the Contract Expression Language clause 212 can be modeled using the EPARC model. Accordingly, the clause 212 can be modeled with the event 216, the principal 218, the act 220, the resource 222, and the condition 224. In an exemplary embodiment, the exclusivity or "only" restriction can vary from one element to another. For example, redirecting a content reference (CR) originating "only" from a particular source is different from "only" redirecting and doing nothing else. In an exemplary embodiment, for example, the former restriction can be specified with an exclusive list of sources that originate CRs, while the latter restriction can be specified with an exclusive list of acts.

Advantageously, the expressiveness of the exemplary Contract Expression Language for specifying permissions, obligations, prohibitions, and the like, also allows for the specifying of clauses of the "only" type. In an exemplary embodiment, expressiveness for exclusivity, for example, can be given by:

Let E, P, A, R and C be some Event, Principal, Act, Resource and Condition. Let G, D and B be respective Grant, Duty and Ban that include E, P, A, R, C. Suppose $X \in \{E, P, A, R, C\}$ is a component that needs to be exclusive. Let G(X) denote the Grant with X non-exclusively, and G[X] the Grant with X exclusively, for example, G is only for X Similarly, D(X), D[X], B(X), and B[X] can be given. Then, the clauses of the "only" type can be expressed using combinations of non-exclusive Clauses, as follows $G[X] \equiv G(x) \wedge B(\sim X)$—a Grant with X exclusive is equivalent to a Grant with X non-exclusive and a Ban with $\sim X$ (not A) non-exclusive.

$D[X] \equiv D(X) \wedge G'(\sim x)$—a Duty with X exclusive is equivalent to a Duty with X non-exclusive and a new G' with $\sim X$ (not x) non-exclusive. Here G' is same as G except that it replaces the Act A in G with $\sim A$ (the Act of not doing A).

$B[X] \equiv B(X) \wedge G(\sim x)$—a Ban with X exclusive is equivalent to a Ban with X non-exclusive and a Grant with $\sim X$ (not x) non-exclusive.

In an exemplary embodiment, the above rules, for example, can be given by:

$G[X] \Leftrightarrow B[\sim X]$—a Grant with X exclusive is equivalent to a Ban with $\sim X$ exclusive.

In an exemplary embodiment, a form of "syntactical sugar" for exclusivity, advantageously, can be provided. For example, each element of the clause 212 can be augmented with an additional, but optional, attribute of a Boolean type, exclusivity, to indicate whether or not the element is to be exclusive. In an exemplary embodiment, the exclusivity attribute can take on, as a default, a false value, and when the exclusivity attribute is specified with "Exclusivity=True," the corresponding element can be specified as being exclusive. The exclusivity attribute can be considered "syntactical sugar" because a normalization transform can be employed to convert exclusive clauses, for example, with the attribute being true, into non-exclusive clauses, based on exemplary exclusivity rules.

In an exemplary embodiment, an exclusive seller in a territory, for example, can be given by:

"Lycos is the only authorized seller of 'I Remember Mama' in Australia."

Accordingly, it is granted that Lycos sells "I Remember Mama" in Australia, and it is also forbidden that anyone else, for example, other than Lycos, sells it in Australia. The exemplary grant and ban can be expressed using the exemplary Contract Expression Language, for example, as given by:

```
<grant>
    <cpx:company>Lycos</cpx:company>
    <cpx:sell/>
    <r:resource licenseIdRef="aSong"/>
    <sx:territory>
        <sx:location>
```

```
            <sx:country>AU</sx:country>
         </sx:location>
      </sx:territory>
   </grant>
   <ban>
      <forAll varName="otherCompany">
      <xmlExpression>//cpx:company!="Lycos"</xmlExpression>
      </forAll>
      <r:principal varRef="otherCompany"/>
      <cpx:sell/>
      <r:resource licenseIdRef="aSong"/>
      <sx:territory>
         <sx:location>
            <sx:country>AU</sx:country>
         </sx:location>
      </sx:territory>
   </ban>
```

In an exemplary embodiment, exclusive product classes, for example, can be given by:

"MGM permits sales by silver-class retailers of only movies older than 2 years."

Accordingly, it is granted that any silver-class retailer can sell any movie older than 2 years, and it is also forbidden that any silver-class retailer sells any movie less than 2 year old. For example, the "silver-class retailer," "any movie older than 2 years" and "any movie less than 2 year old" can be specified using the exemplary Contract Expression Language. The exemplary grant and ban can be expressed using the exemplary Contract Expression Language, for example, as given by:

```
<grant>
    <forAll varName="2YearsOldMovie"/>
    <forAll varName="silverRetailer"/>
    <cpx:company varRef="silverRetailer"/>
    <cpx:sell/>
    <r:resource varRef="2YearsOldMovie"/>
</grant>
<ban>
    <forAll varName="lessThan2YearOldMovie"/>
    <forAll varName="silverRetailer"/>
    <cpx:company varRef="silverRetailer"/>
    <cpx:sell/>
    <r:resource varRef="lessThan2YearOldMovie"/>
</ban>
```

In an exemplary embodiment, exclusive product classes, for example, also can be given by:

"MGM permits sales of movies older than 2 years only by silver-class retailers."

Accordingly, it is granted that any silver-class retailer sells any movie older than 2 years, and it is also forbidden that any retailer that is not in silver-class sells any movie older than 2 years. For example, the "silver-class retailer," "any movie older than 2 years" and "any non-silver-class retailer" can be specified using the exemplary Contract Expression Language. The exemplary grant and ban can be expressed using the exemplary Contract Expression Language, for example, as given by:

```
<grant>
    <forAll varName="2YearsOldMovie"/>
    <forAll varName="silverRetailer"/>
    <cpx:company varRef="silverRetailer"/>
    <cpx:sell/>
    <r:resource varRef="2YearsOldMovie"/>
</grant>
```

```
<ban>
    <forAll varName="2YearsOldMovie"/>
    <forAll varName="nonSilverRetailer"/>
    <cpx:company varRef="nonSilverRetailer"/>
    <cpx:sell/>
    <forAll varName="2YearsOldMovie"/>
</ban>
```

The expressiveness of prohibitions and exclusivity with the exemplary Contract Expression Language can result in potential conflicts in expressed contracts. For example, one contract may require an obligation on Alice to do something and another contract may demand a prohibition on Alice not to do the same thing. In addition, when multiple of the clauses 212 of the same type, for example, the grants 320, are applicable from a same contract or different contracts, it may be necessary to determine that one of the contracts is more preferable to the other contracts.

The present invention includes the recognition that a problem with conflict and multiplicity, for example, can be how to identify potential conflict and multiplicity and resolve same. In an exemplary embodiment, such as problem can be addressed according to policies, for example, specified in a higher level contract. For example, conflicts and multiplicities may recursively occur at a higher level in cases where there may well be multiple higher level contracts.

While detecting and resolving conflicts and multiplicities in a general and automatic way can be desirable, this may not be practical, for example, in a global distributed system requiring high scalability while operating on an imperfect input. For example, consider a task of adding a new contract to a system. In a small system, it can be possible to check for and identify conflicts, force legal negotiation of overrides and apply such overrides, for example, possibly triggering another check and negotiate cycle. By contrast, on a large scale such an exercise typically will not be practical, as entry of new contracts can become a prohibitively expensive task.

In an exemplary embodiment, a "best efforts" rather than "must resolve" approach can be employed, which can imply the finding of a compromise between taking upfront steps to identify and resolve conflicts and allowing for the possibility of "true conflicts" and providing for resolution thereof operationally. Accordingly, systems using the exemplary Contract Expression Language, for example, can be configured to detect and resolve potential conflicts as best as such systems can. In an exemplary embodiment, a sophisticated system can be configured to do a better job at detecting and resolving potential conflicts than a less sophisticated system, so long as the sophisticated system and the less sophisticated system behave in a similar manner in situations where there are no conflicts.

For example, for simple systems, whenever a conflict is detected, the conflict can be treated as an exception with a certain default behavior, for example, sending a message to the contracting parties in question stating the conflict. A significant consideration can be the "cost" of having conflicts in such a system. For example, if the main purpose of such a system is to trade content, the cost of occasionally not being able to resolve a request of a customer is fairly low. If, on the other hand, the "cost," for example, either direct or potential, of not being able to resolve every single request is high, an upfront system configured to identify and resolve conflicts can be provided.

The conflicts that result from bad input typically cannot be avoided. However, the exemplary Contract Expression Language, advantageously, can be employed to create mechanisms to deal with such as problem. How the exemplary Contract Expression Language facilitates the detecting and the resolving of potential conflicts, for example, can depend on what kinds of conflict are of interest. Without the capability of specifying prohibitions, for example, "must not" and exclusivity, for example, "only," a conflict could exist between one or more contracts.

On the other hand, under a same condition, being obligated to do two different things may not result in a conflict. A potential conflict, however, can result from having to do the two different things at the same time, for example, "going out to do shopping" and at the same time "staying home to do gardening." However, such a conflict is hardly a Contract Expression Language issue, as the semantics of such acts naturally conflict. In such a case, identifying such a conflict can be a programmatic issue of a contract management system, for example, involving identifiability and efficiency, for example, in real time. Advantageously, however, the exemplary Contract Expression Language can be employed, for example, to allow the setting of priorities for resolving conflicts, for resolving multiplicities, and the like.

FIG. 5 illustrates an exemplary preference policy model 500 for allowing the setting of priorities for resolving conflicts and multiplicities and that can be employed in the exemplary contract data model 200 of FIG. 2. In FIG. 5, advantageously, the exemplary Contract Expression Language can be employed for specifying a preference policy 506. Accordingly, in order to resolve potential conflicts and multiplicities, a preference relationship can be established among the clauses 212. In an exemplary embodiment, such a relationship can be defined, for example, by configuring the claims 308 to specify that possibly subject to some condition C, one clause A "precedes" or, for example, is preferable to, another clause B, and the like. Advantageously, such a preference policy can be modeled as a kind of assertion, for example, as shown in FIG. 5.

In the exemplary model 500, the policy 506 extends the promise 208 with an additional attribute 508, "evaluationMechanism," for example, with restricted semantics on the clauses 212 of the promise 208. Within the policy 506, the clauses 212 correspond to the claims 308, which can specify, for example, that in the event of E, clause A "precedes" clause B when condition C is met.

In an exemplary embodiment, the optional attribute 508, "evaluationMechanism," of the policy 506, can be used to specify how the claims 308 are to be considered. In an exemplary embodiment, the optional attribute can take a "random" or default value, a "firstApplicable" value, and a "allApplicable" value. The random or default value, for example, can be used to indicate that the claims 308 in the policy 506 can be considered in any order, for example, until an applicable claim of the claims 308 can be found. The "firstApplicable" value, for example, can be used specify that the first claim that is applicable of the claims 308, according to the appearance order of the claims 308 in the policy 506, can be the one to consider. The "allApplicable" value, for example, can be used to express that the applicable claims of the claims 308 should be considered one after another in the sequential order of their appearance in the policy 506.

Using the exemplary model 500, advantageously, many kinds of preference policies can be established. In an exemplary embodiment, an explicit partial ordered preference, for example, can be given by:

---

If the set of Clauses {C1, ..., Cn} is known and a partial order p is given for the preference relationship among the Clauses, then a Policy can be formed in the following way:
For any pair of Clauses Ci and Cj where $1 \leq i, j \leq n$, the Policy includes the (, for example, un-conditional)
claim, "Ci precedes Cj,"
<policy>
    ...
    <claim>
        <clause licenseIdRef="Ci"/>
        <clause licenseIdRef="Cj"/>
    </claim>
    ...
</policy>
if and only if
$(Ci, Cj) \in p$, (for example., Ci precedes Cj according to the order p).

---

In an exemplary embodiment, preference based on issuance times of the clauses 212, for example, can be given by:

---

If the linear order over the issuance times of Clauses is used as a criterion to resolve the conflict, then a Policy with a single Claim can be constructed as follows:
<policy>
    <claim>
        <forAll varName="A"/>
        <forAll varName="B">
        <clause varRef="A"/>
        <clause varRef="B"/>
        <csx:xmlBooleanExpression>
            op:dateTime-less-than(
            xs:dateTime(xf:document(../../clause[1])//issuer/details/timeOfIssue),
            xs:dateTime(xf:document(../../clause[2])//issuer/details/timeOfIssue) ),
        </csx:xmlBooleanExpression>
    </claim>
</policy>

---

Accordingly, an early issued clause wins preference. In an exemplary embodiment, when the appearances of clauses A and B are switched in the claim 308, the preference goes to a later issued clause. In an exemplary embodiment, the element "csx:xmlBooleanExpression" can be an element that can include a Boolean XPath expression, and can serve a condition whose truth-value can be equal to one of the Boolean XPath expressions.

In an exemplary embodiment, preference based on the issuers 214 of the clauses 212, for example, can be given by:

If a partial order over the Issuers of Clauses is used as a criterion to resolve the conflict, then a policy with
a single Claim can be constructed as follows:
```
<policy>
    <claim>
        <forAll varName="A"/>
        <forAll varName="B">
        <clause varRef="A"/>
        <precede/>
        <clause varRef="B"/>
        <allConditions>
            <csx:xmlBooleanExpression>
    xf:document(../../clause[1])//issuer="Alice"</csx:xmlBooleanExpression>
            <csx:xmlBooleanExpression >
    xf:document(../../clause[2])//issuer="Bob"</csx:xmlBooleanExpression>
        </allConditions>
    </claim>
</policy>
```

Accordingly, the promise issued by Alice, and hence the clauses within the promise of Alice get preference over the promise issued by Bob, and hence the clauses within the promise of Bob.

In an exemplary embodiment, preference based on types of promises, for example, can be given by:

If a partial order over the types of Clauses (for example, "Grant," "Duty" and "Ban") is used as a criterion to resolve the conflict, then a policy with a single Claim can be constructed as follows:
```
<policy>
    <claim>
        <forAll varName="A"/>
        <forAll varName="B">
        <clause varRef="A"/>
        <precede/>
        <clause varRef="B"/>
        <allConditions>
            <csx:xmlBooleanExpression>
    xf:document(../../clause[1]).name ="Grant"</csx:xmlBooleanExpression>
            <csx:xmlBooleanExpression >
    xf:document(../../clause[2]).name ="Ban"</csx:xmlBooleanExpression>
        </allConditions>
    </claim>
</policy>
```

Accordingly, the clause 212 expressed as the grant 302 can be preferable to the clause 212 expressed as the ban 306.

In an exemplary embodiment, different preference claims, for example, can be combined together using the attribute 508, "evaluationMechanism." For example, by putting together in the policy 506 two claims 308 that declare preference based on the issuers 214 and the types of the clauses 212, advantageously, a combined preference rule can be established, first based on the issuers 214 and then types of the clauses 212, for example, as given by:

("Alice", "Grant")⇐("Alice", "Ban")⇐("Bob", "Grant")⇐("Bob", "Ban").

The exemplary policy/claim combinations can be expressed using the exemplary Contract Expression Language, for example, as given by:

```
<policy evaluationMechanism="allApplicable">
    <claim>
        <forAll varName="A"/>
        <forAll varName="B">
        <clause varRef="A"/>
        <precede/>
        <clause varRef="B"/>
        <allConditions>
            <csx:xmlBooleanExpression>
    xf:document(../../clause[1])//issuer="Alice"</csx:xmlBooleanExpression>
            <csx:xmlBooleanExpression >
    xf:document(../../clause[2])//issuer="Bob"</csx:xmlBooleanExpression>
        </allConditions>
    </claim>
    <claim>
        <forAll varName="A"/>
        <forAll varName="B">
        <clause varRef="A"/>
        <precede/>
```

-continued
```
        <clause varRef="B"/>
        <allConditions>
            <csx:xmlBooleanExpression>
    xf:document(../../clause[1]).name ="Grant"</csx:xmlBooleanExpression>
            <csx:xmlBooleanExpression >
    xf:document(../../clause[2]).name ="Ban"</csx:xmlBooleanExpression>
        </allConditions>
    </claim>
</policy>
```

In an exemplary embodiment "A or B, but prefer A," for example, can be given by:

"UMG may link to CDNOW, UMG may link to Amazon, and UMG will link to CDNOW if it is allowed to."

Accordingly, it is claimed that the clause 212 for linking to CDNOW precedes the clause 212 for linking to Amazon. The exemplary policy/claim combination can be expressed using the exemplary Contract Expression Language, for example, as given by:

```
<policy>
    <claim>
        <clause licenseIdRef="licenseForLinkingToCDNOW"/>
        <precede/>
```

-continued
```
        <clause licenseIdRef="licenseForLinkingToAmazon"/>
    </claim>
</policy>
```

In an exemplary embodiment, a contract that overrides the law, for example, can be given by:

"a) Amazon may sell 'The Monkees' episodes, b) All sales of 'The Monkees: The Time Machine' episode outside of the U.S. are prohibited, c) Amazon chooses to sell the episode outside of the U.S."

Accordingly, it is a policy of Amazon that the clause 212 for selling "The Monkees" episodes is preferable to the clause 212 for banning sales of "The Monkees: The Time Machine" episode outside of the U.S. The exemplary policy/claim combination can be expressed using the exemplary Contract Expression Language, for example, as given by:

```
<policy>
    <claim>
    <clause licenseIdRef="licenseForSellingTheMonkeesEpsisodes"/>
    <precede/>
    <clause licenseIdRef="interdictForSellingTheMonkees-TheTimeMachineEpsisode"/>
        </claim>
        +<signer licensePartId="Amazon">
</policy>
```

In an exemplary embodiment, a price preference, for example, can be given by:

"For all retailers and all items, if more than one price is available from the same retailer, choose the lowest price."

For example, it is a policy of Random House that a clause A is preferable to a clause B, if (a) the signers are same, (b) the offered resources are same, and (c) the price, for example, fee/paymentFlat/rate, in the clause A is less than that of the clause B. The exemplary policy/claim combination can be expressed using the exemplary Contract Expression Language, for example, as given by:

```
<policy>
    <claim>
        <forAll varName="A"/>
        <forAll varName="B">
        <clause varRef="A"/>
        <precede/>
        <clause varRef="B"/>
        <csx:xmlBooleanExpression>
            op:equal(
    xf:document(../../clause[1])//r:issuer/ds:signature/ds:keyHolder,
    xf:document(../../clause[2])//r:issuer/ds:signature/ds:keyHolder) AND
            op:equal(
    xf:document(../../clause[1])//r:grant/r:resource,
    xf:document(../../clause[2])//r:grant/r:resource) AND
            op:less-than(
    op:number(xf:document(../../clause[1])//Grant/sx:fee/sx:paymentFlat/rate),
    op:number(xf:document(../../clause[2])//Grant/sx:fee/sx:paymentFlat/rate) )
        </csx:xmlBooleanExpression>
```

```
    </claim>
    +<signer licensePartId="RandomHouse">
</policy>
```

The exemplary Contract Expression Language, advantageously, can be employed for specifying trust and binding relationships. For example, applications, such as Digital Rights Management, content reference, e-commerce, other distributed services, and the like, can entail interaction between entities that do not know each other. In addition to the principals of such interactions being previously unknown to each other, resources to be controlled can be moving from one system to another, for example, when a movie can be downloaded from a distributor site to a user PC and access on the PC also needs to be controlled. Further, the behavior of some principals may be regulated by policies defined by other principals, for example, when usage rights to consumers are granted by the content owners. In such situations, however, traditional assumptions for establishing and enforcing access control may not hold.

Advantageously, such policies can be expressed as contracts specified using the exemplary Contract Expression Language. The present invention includes the recognition that, when a contract is to be executed, the understanding of what to trust and what is bound within the contract must be determined. For example, an issuer I can grant a principal P a right to play a movie, as specified in contract based on the exemplary Contract Expression Language. However, P needs to establish some level of trust for I, for example, to ensure that I is a legitimate authority to grant P such a right.

In a further example, two homeowners can sign a contract and require respective family members of the homeowners to bind to the contract. Accordingly, a binding relationship needs to be specified in order to determine who are bound to the signers, and, for example, the corresponding signatures.

In the exemplary Contract Expression Language, such trust and binding relationships, for example, can be specified using the claims 308 with the acts 220 "trust" and "bind." Advantageously, such relationships can be defined by specifying in the claim 308 that, possibly subject to the event (E) 216 and the condition (C) 224, the principal (P) 218 trusts or binds to the issuer (I) 214 or the signer (S) 210, for example, as given by:
  Claim/[E, P, "trust", I, C]
  and
  Claim/[E, P, "bind", S, C].

Advantageously, such relationships also can be defined at the clause 212 level by specifying in the claim 308 that, possibly subject to the event (E) 216 and the condition (C) 224, the principal (P) 218 trusts or binds to a clause K, for example, as given by:
  Claim/[E, P, "trust," K, C]
  and
  Claim/[E, P, "bind", K, C].

Accordingly, such a trust policy or binding policy, for example, can be modeled as an assertion. In an exemplary embodiment, as part of the semantics of the acts 220 trust and bind, anyone should trust themselves and whatever they issue, and anyone should bind to themselves and whatever they sign. Accordingly, the following claims can be made unconditionally, for example, as given by:
  Claim/[_, P, "trust", P, _]
  and
  Claim/[_, P, "bind", P, _].

The exemplary Contract Expression Language, for example, can be employed for specifying dependencies among the clauses 212. For example, the validity of the clauses 212 may be dependent on the validity of another of the clauses 212, such as the grant 302 for a right to view an R-rated movie can be dependent on the claim 308 for an assertion that the principal 218 is at least 18 years old. Advantageously, the condition 224 "Valid," for example, can be used for specifying such a dependency. In an exemplary embodiment, a Clause(E, P, A, R, C) can become dependent on the validity of another clause by adding the condition valid, for example, as given by:
  Clause(E, P, A, R, AllCondition/[Valid/[Clause', Claim1, . . . , ClaimN], C]),
  where Claim1, . . . , ClaimN are any assertions to be used to evaluate the Event and Condition of Clause' in the current context.

The exemplary Contract Expression Language, advantageously, can be employed for specifying performance and non-performance dependence, such as remedies. For example, in order to specify remedy and warranty, conditions to specify whether or not an obligation or prohibition has been fulfilled in the past need be employed. Otherwise, some other obligations, prohibitions and/or rights may incur. Advantageously, the conditions 224 "Exercised" and "NotExercised" can be used for such a purpose. For example, a Clause(E, P, A, R, C) can become dependent on not fulfilling an obligation by adding the condition NotExercised, for example, as given by:
  Clause(E, P, A, R, AllCondition/[NotExercised/[Duty, StateReference, Count], C]).

Similarly, a Clause(E, P, A, R, C) can become dependent on not obeying a prohibition by adding the condition Exercised, for example, as given by:
  Clause(E, P, A, R, AllCondition/[Exercised/[Ban, StateReference, Count], C]).

The exemplary Contract Expression Language, advantageously, can be employed for specifying delegation. For example, delegation can be important in highly dynamic and widely distributed systems, because delegation provides mechanisms for passing of rights, obligations, prohibitions, and the like, to others in a manner that may not foreseen or specified at the time a contract or a policy is defined. Advantageously, delegation can be specified using "DelegationControl" in XrML as a an implicit permission and also using the act 220 "delegate" so that the delegation can be explicitly specified as a permission, an obligation, a prohibition, and the like, for example, as given by:
  Grant/[E, P, "delegate", K, C],
  Duty/[E, P, "delegate", K, C],
  Ban/[E, P, "delegate", K, C].
  where K is any Clause, which can be in turn about another delegation.

Accordingly, when a principal P1 delegates an act 220 to another principal P2, the principal P2 who is to perform the act 220 can become the composite principal, for example, as given by:
  OnBehalfPrincipal/[P2,P1].

The exemplary Contract Expression Language, advantageously, can enable numerous exemplary contract processing system models. For example, based on the exemplary data model 200 and the exemplary semantics model, the exemplary Contract Expression Language can be used to configure numerous processing system models. In an exemplary embodiment, the exemplary system models, for example, based on the logic semantics of expressions specified with the exemplary Contract Expression Language, can include query-driven models, data-driven models, conflict or multiplicity-driven models, backward inference models, forward inference models, conflict resolution models, and the like.

In an exemplary query-driven processing system model, for example, for one or more of the contracts 202, a query in the form of the clause 212, and a context in the form of a list of the claims 308 can be submitted to the system for processing. The clauses 212 in the contracts 202, for example, together with the signers 210 thereof, can be matched against the query to generate a query response. In an exemplary embodiment, the event 216 and the condition 224 elements can be simplified based on the information provided in the context and the clauses 212 matching the query can be used to form the query response.

In an exemplary context-driven processing system model, for example, for one or more of the contracts 202, a context in the form of a list of the claims 308 can be submitted to the system for processing. The clauses 212 in the contracts 202, for example, together with the signers 210 thereof, and having the event 216 and the condition 224 elements satisfied in the context can be delivered as a response. In an exemplary embodiment, the clauses 212 that can form the response can be the statements held in the context.

In an exemplary conflict or multiplicity-driven processing system model, for example, for one or more of the contracts 202, a conflict set in the form of one or more of the clauses 212, for example, having common principals, acts, resources, and the like, that can result in a conflict, and a context in the form of a list the claims 308 can be submitted to the system for processing. A conflict resolution result can be provided in the form of a minimal subset of the clauses 212 in the contracts 202 that can be chosen according to a preference, conflict resolution rules, conflict resolution policies, and the like, which can be defined in the contracts 202. In an exemplary embodiment, the clauses 212 that can form the conflict resolution result can be the result of resolving conflicts among the common principals, acts, resources, and the like.

The exemplary Contract Expression Language, advantageously, enables exemplary context models. In an exemplary embodiment, a context can include one or more propositions, for example, that can be used describe a state of affairs, and the like. Semantically, the exemplary context can include one or more propositions generated by one or more of the exemplary Contract Expression Language claims 308. Advantageously, the exemplary context, for example, can be used provide a set of factual statements that can be used to validate conditions related to the events 216, that can be used to validate conditions related to the conditions 224, that can be used to identify and match the principals 218, the acts 220 and the resources 222, that can be used to form trust relationships of the issuers 214 and the signers 210, and the like.

In an exemplary embodiment, the exemplary context, for example, can include propositions to declare that the principal (P) 218 possesses a role, such as and administrator role, for example, issued by an owner and signed by P, trusts whatever the issuer (I) 214 issues, and binds to whatever the signer (S) 210 signs, if P is one of the issuers 214 or the signers 210 of the corresponding statements, for example, as given by:

Claim([ ], P, possess, administrator, [ ], Ilist, Slist)←member(owner, list),
member(P, Slist).
Claim(E, P, trust, I, C, Ilist, Slist)←Event(E), Cond(C), member(P, Ilist).

Claim(E, P, bind, S, C, Ilist, Slist)←Event(E), Cond(C), member(P, Slist).

FIG. 6 illustrates an exemplary query-driven processing system 600 based on the exemplary Contract Expression Language. In FIG. 6, a query 606 in the form of the clause 212 can be processed by a Contracts Expression Language (CEL) processor 602 against one or more the contracts 202 stored in a contracts database 604, and a context 608, in order to generate a response 610 to the query 606. In an exemplary embodiment, based on the semantics model of the contracts 202 and the semantics model of the context 608, the query 606 can include the clause 212, for example, such as Grant(E, P, A, R, C), and the like. The query 606 can be processed according to the propositions expressed by the contracts 202 and the context 608, for example, by verifying if the query 606 can be logically proved by the propositions given by the contracts 202 and the context 608, in order to generate the response 610 in the form of the grant 302, the duty 304, the ban 306, the claim 308, and/or the intent 310 elements matching the query 606.

Advantageously, by employing the exemplary query-driven model, sophisticated processing systems and tasks can be configured, for example, according to the modality of the clauses 212. For example, when the clause 212 of the query 606 includes the intent 310 element, the processing response 610 can include a set of the grants 302, the duties 304, the bans 306, and the claims 308 that match the intent 310 element of the clause 212. In an exemplary embodiment, matching the grant 302 element against the intent 310 element, for example, cam be given by:

Intent(E, P, A, R, C) ← Grant(E', P', A', R', C', Ilist', Slist'),
    EventImplication(E, E'),
    MatchP(P, P'), MatchA(A, A'), MatchR(R, R'),
    CondImplication(C, C'),
    Member(I, Ilist'),
    ClauseOf(Grant(E', P', A', R', C', Ilist', Slist'), Pro),
    Issuing(Pro, I),
    Claim(E, P, trust, I, C, Ilist', Slist'),
    Write(Grant(E, P, A, R, C, Ilist', Slist')).
Intent(E, P, A, R, C) ← Grant(E', P', A', R', C', Ilist', Slist'),
    EventImplication(E, E'),
    MatchP(P, P'), MatchA(A, A'), MatchR(R, R'),
    CondImplication(C, C'),
    Member(S, Slist'),
    ClauseOf(Grant(E', P', A', R', C', Ilist', Slist'), Pro),
    PromiseOf(Pro, CE),
    Signing(CE, S),
    Claim(E, P, bind, I, C, Ilist', Slist'),
    Write(Grant(E, P, A, R, C, Ilist', Slist')).
EventImplication(E, E') ← Event(E), Event(E').
EventImplication(E, E') ← Event(E').
EventImplication(E, E').
CondImplication(C, C') ← Cond(C), Cond(C').
CondImplication(C, C') ← Cond(C').
CondImplication(C, C').

The above exemplary pair of propositions, for example, can be used to output a grant that matches against an intent and that is issued by a trusted issuer, for example, of a promise including the grant, or that is issued by a bound signer, for example, of a contract that can include the promise including the grant. In an exemplary embodiment, when the clause grant element in the pair of exemplary propositions is replaced by the duty, ban, and claim elements, for example, to generate other three pairs of propositions, one or more grants, duties, bans, and claims can be generated as the response to the intent. In an exemplary embodiment, the "EventImplication" proposition can be used to specify the logical implication of an event (E) for another event (E', for example, E→E') and the "CondImplication" proposition can be used to specify the logical implication of a condition (C) for another condition (C', for example, C→C').

In an exemplary embodiment, one or more grants, duties and bans can be generated as a response to a grant query for generating a duty, for example, as given by:

---

Grant(E, P, A, R, C) ← Duty(E', P', A', R', C', Ilist', Slist'),
    EventImplication(E, E'),
    MatchP(P, P'), MatchA(A, A'), MatchR(R, R'),
    CondImplication(C, C'),
    Member(I, Ilist'),
    ClauseOf(Duty(E', P', A', R', C'), Pro),
    Issuing(Pro, I),
    Claim(E, P, trust, I, C, Ilist', Slist'),
    Write(Duty(E, P, A, R, C, Ilist', Slist')).
Grant (E, P, A, R, C) ← Duty(E', P',A',R',C', Ilist', Slist'),
    EventImplication(E, E'),
    MatchP(P, P'), MatchA(A, A'), MatchR(R, R'),
    CondImplication(C, C'),
    Member(S, Slist'),
    ClauseOf(Duty(E', P', A', R', C'), Pro),
    PromiseOf(Pro, E),
    Signing(E, S),
    Claim(E, P, bind, I, C, Ilist', Slist'),
    Write(Duty(E, P, A, R, C, Ilist', Slist')).

---

Figure 7:
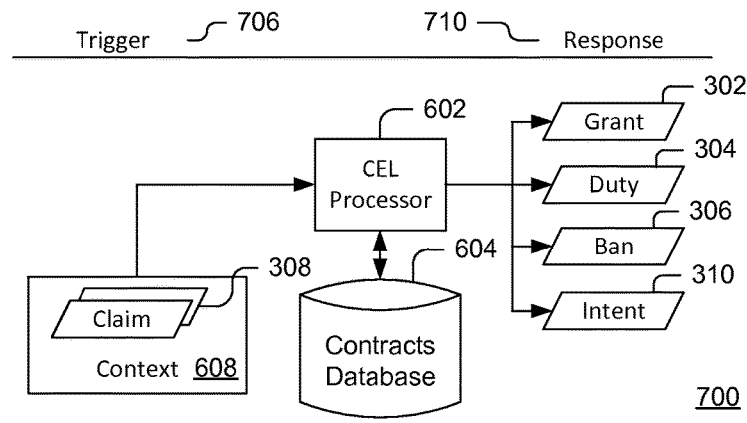
FIG. 7 illustrates an exemplary context-driven processing system based on the exemplary Contract Expression Language.

FIG. 7 illustrates an exemplary context-driven processing system 700 based on the exemplary Contract Expression Language. In FIG. 7, one or more contracts 202 stored the contracts database 604 can be processed by the CEL processor 602 against a trigger 706 in the form of the context 608, in order to yield a response in the form of a clause expressed in the contract 202 that is valid in the given context 608. In an exemplary embodiment, for example, based on the exemplary semantics model of the exemplary Contract Expression Language Contracts and the semantics model of the context 608, the exemplary system 700 can examine propositions of the form Clause(E, P, A, R, C, Ilist, Slist) that are expressed by the contracts 202, can evaluate the conditions of the event (E) 216 and the condition (C) 224 elements related to the events 216 and conditions 224 thereof, and can output such clauses with corresponding conditions thereof being satisfied as a response 710.

Advantageously, the exemplary context-driven system 700 model can be used build system applications to notify of valid permissions, obligations, prohibitions intentions, and the like, within a given context, for example, in order to perform and execute a set of contracts. In an exemplary embodiment, the response 710 can be generated by evaluating propositions, each of which, when evaluated to be true, outputs a valid grant 302, duty 304, ban 306 or intent 310 element, for example, as given by:

---

ValidGrant( ) ←Grant(E, P, A, R, C, Ilist, Slist),
                Event(E), Cond(C),
                Write(Grant(E, P, A, R, C, Ilist, Slist)).
ValidDuty( ) ← Duty(E, P, A, R, C, Ilist, Slist),
                Event(E), Cond(C),
                Write(Duty(E, P, A, R, C, Ilist, Slist)).
ValidBan( ) ← Ban(E, P, A, R, C, Ilist, Slist),
                Event(E), Cond(C),
              Write(Ban(E, P, A, R, C, Ilist, Slist)).
ValidIntent( ) ← Intent(E, P, A, R, C, Ilist, Slist),
                Event(E), Cond(C),
              Write(Intent(E, P, A, R, C, Ilist, Slist)).

---

Figure 8:
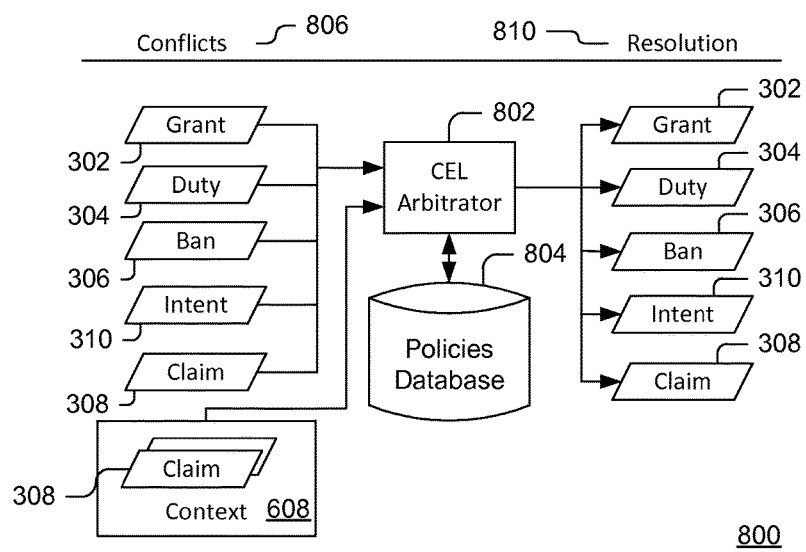
FIG. 8 illustrates an exemplary conflict or multiplicity-driven processing system based on the exemplary Contract Expression Language.

FIG. 8 illustrates an exemplary conflict or multiplicity-driven processing system 800 based on the exemplary Contract Expression Language. In the query-driven 600 and context-driven 700 processing system models, the processing of the contract 202 can result in one or more of the clauses 212 having a potential conflict, for example, such a grant and a ban or a duty and a ban applying to the same principal, act or resource, and the like. The processing of the contract 202 also can result in one or more of the clauses 212 having potential multiplicities, for example, multiple grants, or a grant and a duty, and the like.

In order to resolve the above conflicts and multiplicities, advantageously, exemplary preference policies can be specified in the exemplary Contract Expression Language. In an exemplary embodiment, the preference policies can be relatively simple, for example, such as ban overrides duty, which overrides grant, and the like, or relatively complex employing the authority of the issuers of the clauses, for example, such as clauses issued by a higher authority are preferable to others, and the like. In addition, the preference policies can be based on the specificity of the clauses, for example, such as more specific clauses are preferable to more generic clauses, and the like. Further, the preference policies can be based on the issuing time of the clauses, for example, such as more recently issued clauses are preferable to older clauses, and the like.

In FIG. 8, in the exemplary conflict or multiplicity-driven processing system 800 model, two or more clauses 302-310 with potential conflicts and multiplicities in the form of a conflicts or multiplicities input 806, for example, can be processed by a Contact Expression Language (CEL) arbitrator 802 against the context 608 including one or more claims 308 and a set of preference policies stored in a policies database 804. In an exemplary embodiment, a preference relation, as defined by the preference policies, for example, can be applied by the exemplary system 800 to the input clauses 302-310 to determine which of the input clauses 302-310 is or are preferable over the others in the form of a resolution result 810.

The above problem, for example, can be analogous to a graph-theoretical problem. For example, each input clause 302-310 can be a vertex and two vertices can be connected from one to the other, if one clause is preferable to the other clause. The problem can be to find out which vertex or vertices are "source" vertices or nodes in the graph, where a "source" node is a node that has no incoming link connected thereto. A direct solution can be to test, for a given vertex, whether or not there is another vertex that has a link to the given vertex, and if the given vertex has no one to link thereto, the given vertex can be a "source." Based on such a solution, an algorithm can be employed, for example, for evaluating the proposition:

ConflictResolve(ClauseList, ClauseList, OutputList, SomePrincipal).

and as given by:

---

ConflictResolve([ W \ X], Y, Z, P) ← Overridden(W, Y, I),
ConflictResolve(X, Y, Z, P).
ConflictResolve([ W \ X], Y, [W \ Z], P) ←
ConflictResolve(X, Y, Z, P).
Overridden(W, [X \ Y], P) ← Claim(E, W, procede, X, C, Ilist, Slist), -continued

```
    Event(E), Cond(C),
    Member(I, Ilist),
    ClauseOf(Claim(E, W, procede, X, C), Pro),
    Issuing(Pro, I),
    Claim(E, P, trust, I, C, Ilist', Slist').
Overridden(W, [X \ Y]) ← Claim(E, W, procede, Y, C, Ilist, Slist),
    Event(E), Cond(C),
    Member(S, Slist),
    ClauseOf(Claim(E, W procede, Y, C), Pro),
    PromiseOf(Pro, CE),
    Signing(CE, S),
    Claim(E, P, bind, I, C, Ilist', Slist'),
```

The exemplary algorithm above, for example, can be based on an implementation of the graph-theoretical solution to resolve potential conflicts and multiplicities in a list of clauses, "ClauseList," and to output the resolution result 810 in a list, "OutputList." In an exemplary embodiment, the argument "SomePrincipal" can be employed to ensure that the preference relationship stated in the preference policies can be trusted by or can be bound to the principal.

Figure 9:
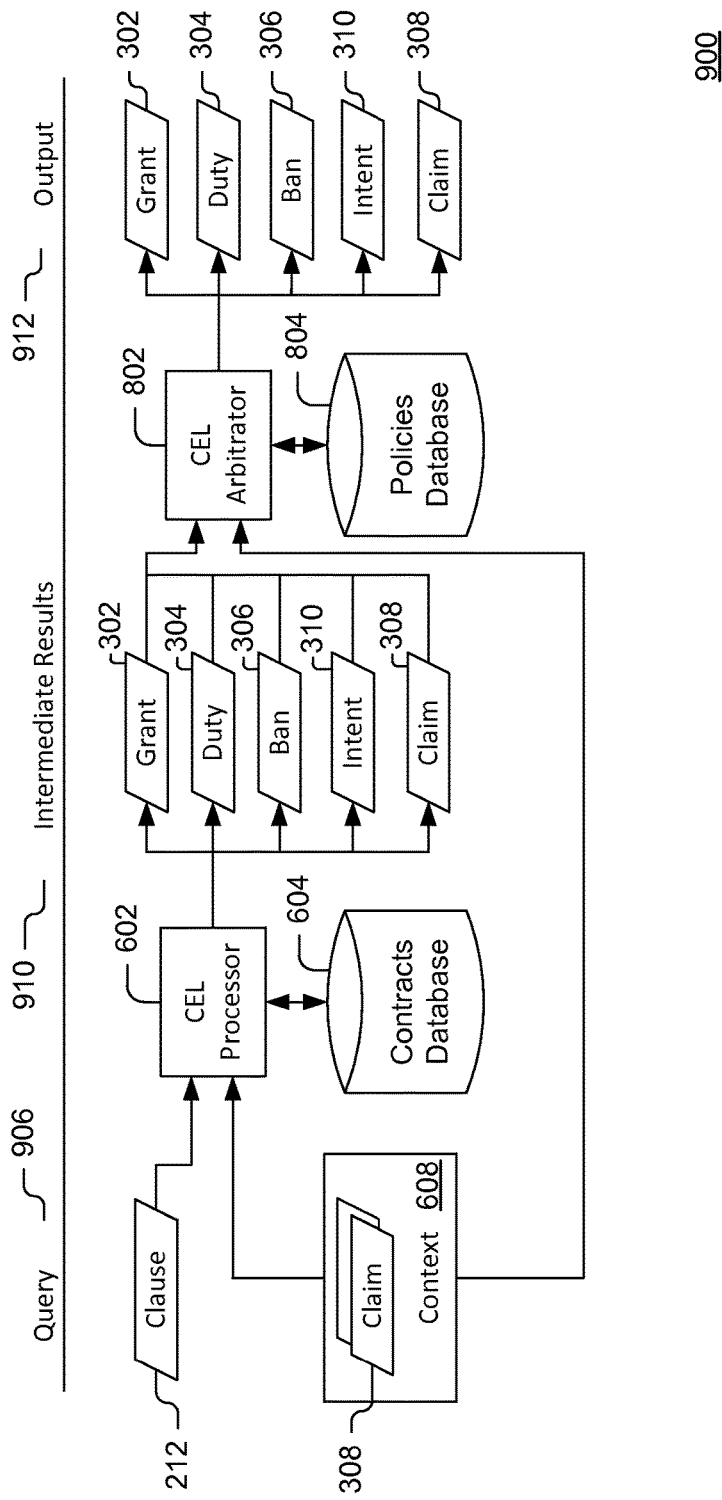
FIG. 9 illustrates an exemplary composite or hybrid processing system based on the exemplary Contract Expression Language.

FIG. 9 illustrates an exemplary composite or hybrid processing system 900 based on the exemplary Contract Expression Language. In FIG. 9, the exemplary processing system 900 model, advantageously, can enable a workflow for applying preference policies stored in the policies database 804 to query-processing results 910 for contracts 202 stored in the contracts database 604 with assistance of the CEL processor 602 and the CEL arbitrator 802.

The exemplary CEL processor 602, for example, can take as an input the clause 212 in the form of the query 906, and one or more of the claims 308 employed as a description of the context 608 and that can be used to define a system environment, a usage state, a list of attributes, and the like, of objects, subjects, and the like. The CEL processor 602 consults a set of the contracts 202, for example, as a knowledge base in the form of the contracts database 604, and generates a set of possible intermediate results 910 to the query 906 as response. In an exemplary embodiment; the intermediate results 910 can include one or more grants, duties, bans, claims or intents 302-310.

In an exemplary embodiment, when the exemplary system 900 generates two or more results 910 based on the query 906, the exemplary CEL arbitrator 802 can be invoked, initiated, and the like. The CEL arbitrator 802 can apply the set of preference policies, for example, as a knowledge base in the form of the policies database 804 in order to determine preference among the results 910.

In an exemplary embodiment, the policies can be specified as a set of the input claims 308. For example, each of the claims 308 can be used to compare two of the promises 208 and can be used to specify that a promise is more preferable to another promise, for example, such as in the form of "promise A precedes promise B, possibly under some condition." Accordingly, the output 912 of the CEL arbitrator 802 can include the outcome of such as preference resolution. In an exemplary embodiment, if there is only one promise left, then the preference gets determined, for example, according to the available policies. If, however, there are two or more promises left, then the preference can not be, for example, completely, determined and an external mechanism, error message, and the like, can be employed as needed.

In further exemplary embodiments, processing system models can be configured, for example, based on one or more of the query-driven 600, the context-driven 700, and the conflict or multiplicity-driven 800 system models. In addition, a sequence of conflict or multiplicity-driven processing system 800 models can be configured, each with a different set of preference policies, advantageously, for resolving conflicts according to preference policies, for example, from different authorities, administrative domains, and the like.

Figure 10:
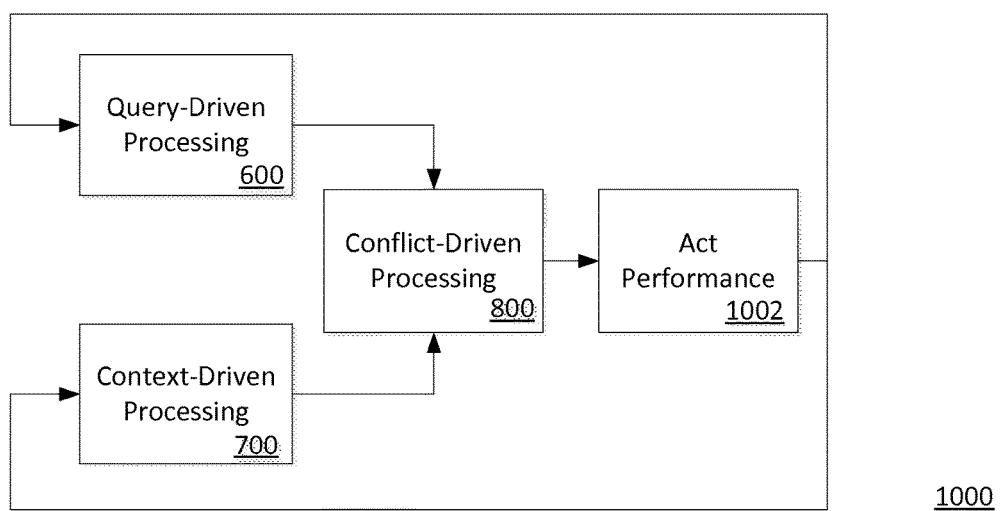
FIG. 10 illustrates an exemplary linked system based on the exemplary Contract Expression Language.

FIG. 10 illustrates an exemplary linked system 1000 based on the exemplary Contract Expression Language. In FIG. 10, the exemplary query-driven 600, the context-driven 700, and the conflict or multiplicity-driven 800 system models can be integrated with other system components 1002 that can perform the acts 220 as specified in the clauses 212. Advantageously, the exemplary system 1000, for example, can be used to generate the events 216, can be used to modify the system context, and the like.

Figure 11:
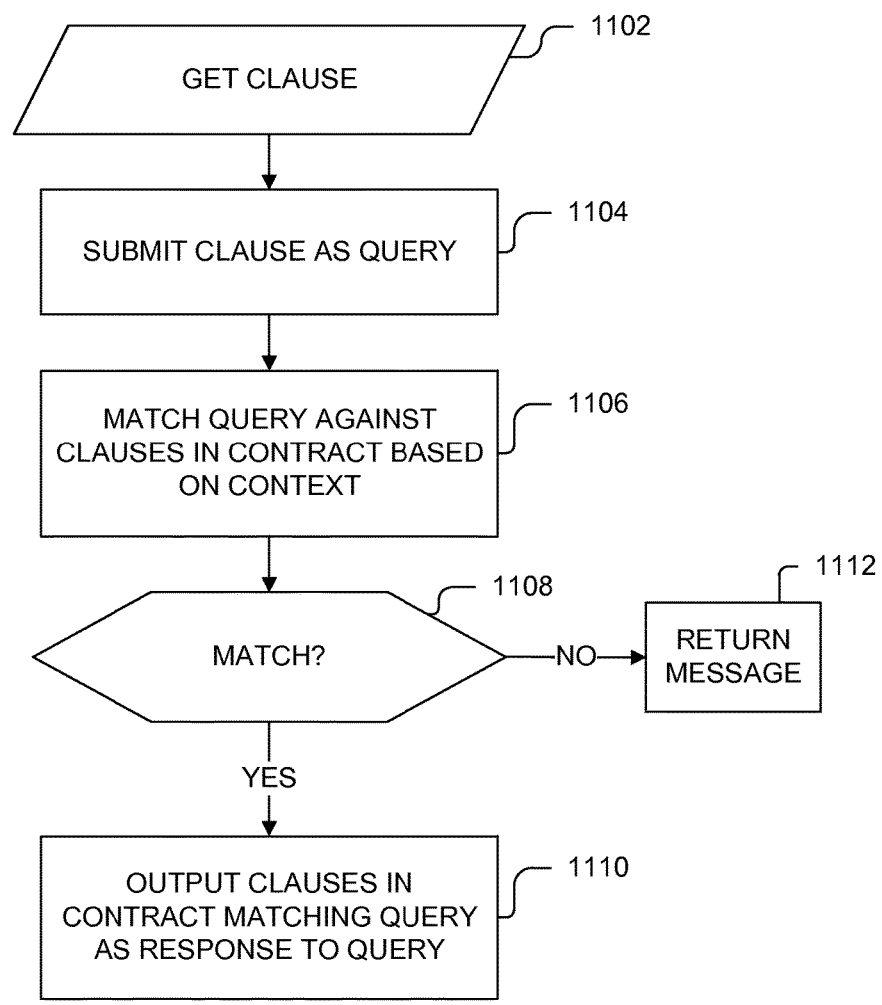
FIG. 11 is a flowchart for illustrating the exemplary query-driven processing of the system of FIG. 6.

FIG. 11 is a flowchart for illustrating the exemplary query-driven processing of the system 600 of FIG. 6. In FIG. 11, at step 1102, for example, the clause 212 can be obtained for processing and at step 1104 the clause 212 can be submitted as the query 606. At step 1106, the query 606 can be matched against clauses in the contract 202 from the database 604 based on the context 608 defined by one or more of the claims 308. If there is a match, as determined by step 1108, the clauses in the contract 202 matching the query 606 can be output as the response 610, for example, including one or more of the elements 302-310. Otherwise, at step 1112, an appropriate message can be returned. Additional of the clauses 212 can be submitted as queries for query-driven processing by repeating the steps 1102-1112.

Figure 12:
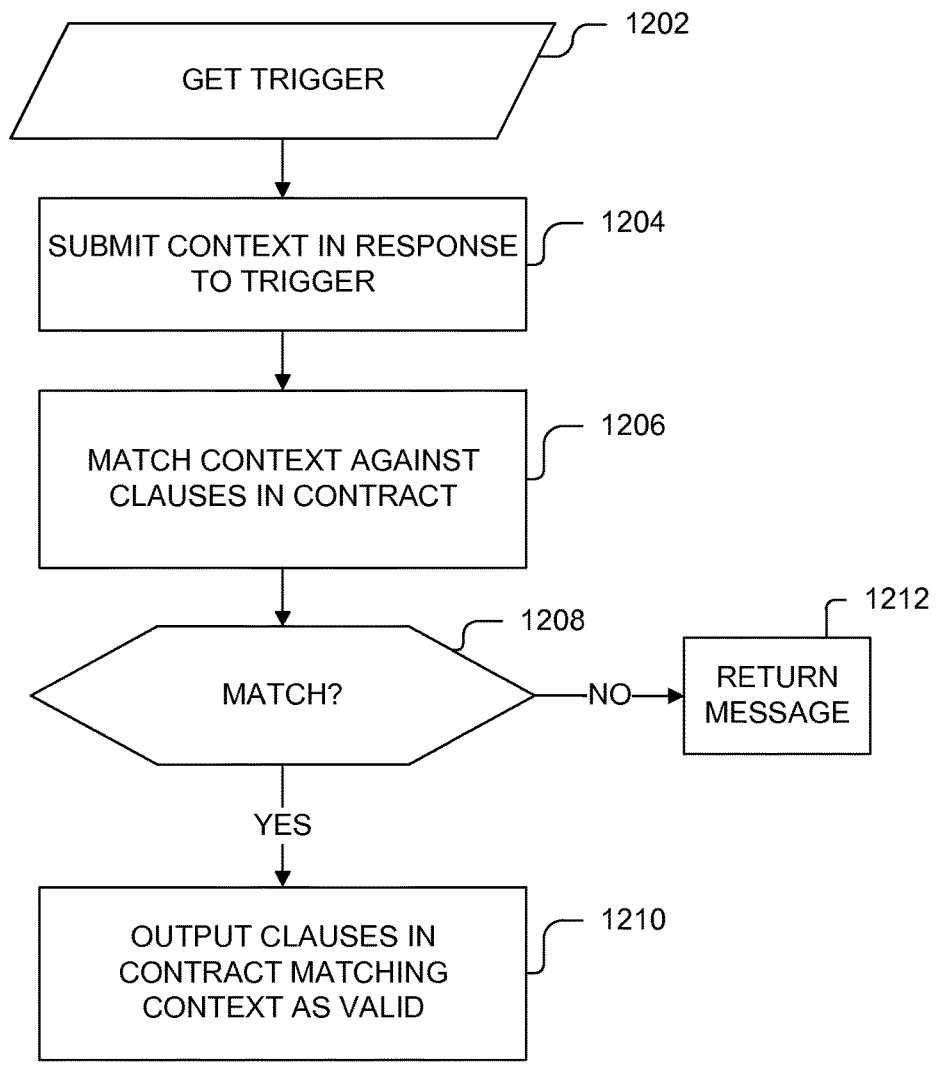
FIG. 12 is a flowchart for illustrating the exemplary context-driven processing of the system of FIG. 7.

FIG. 12 is a flowchart for illustrating the exemplary context-driven processing of the system 700 of FIG. 7. In FIG. 12, at step 1202, for example, the trigger 706 in the form of the context 608 can be obtained for processing and at step 1204 the context 608 defined by one or more of the claims 308 can be submitted for processing. At step 1206, the context 608 can be matched against clauses in the contract 202 from the database 604. If there is a match, as determined by step 1208, the clauses in the contract 202 matching the context 608 can be output as valid as the response 710, for example, including one or more of the elements 302-310 deemed as valid. Otherwise, at step 1212, an appropriate message can be returned. Additional of the contexts 608 can be submitted for context-driven processing by repeating the steps 1202-1212.

Figure 13:
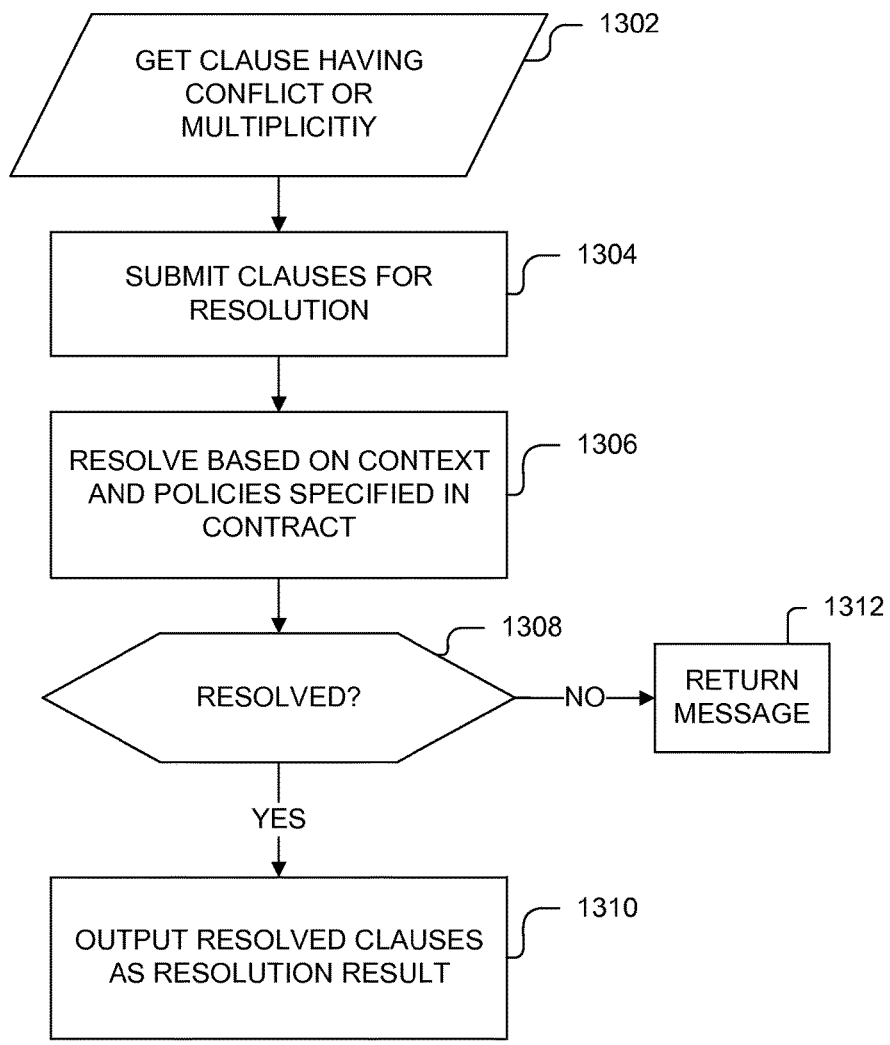
FIG. 13 is a flowchart for illustrating the exemplary conflict or multiplicity-driven processing of the system of FIG. 8.

FIG. 13 is a flowchart for illustrating the exemplary conflict or multiplicity-driven processing of the system 800 of FIG. 8. In FIG. 13, at step 1302, for example, two or more of the clause 302-310 identified as having conflicts or multiplicities can be obtained for processing and at step 1304 and the clauses 302-310 can be submitted as the conflicts or multiplicities input 806. At step 1306, the conflicts or multiplicities can be resolved based on the context 608 defined by one or more of the claims 308 and preferences policies specified in one or more of the contracts 202 from the database 604. If the conflicts or multiplicities can be resolved, as determined by step 1308, the resolved clauses can be output as the resolution result 810, for example, including one or more of the elements 302-310 being resolved. Otherwise, at step 1312, an appropriate message can be returned. Additional of the clause 302-310 identified as having conflicts or multiplicities can be submitted for conflict or multiplicity-driven processing by repeating the steps 1302-1312.

Figure 14:
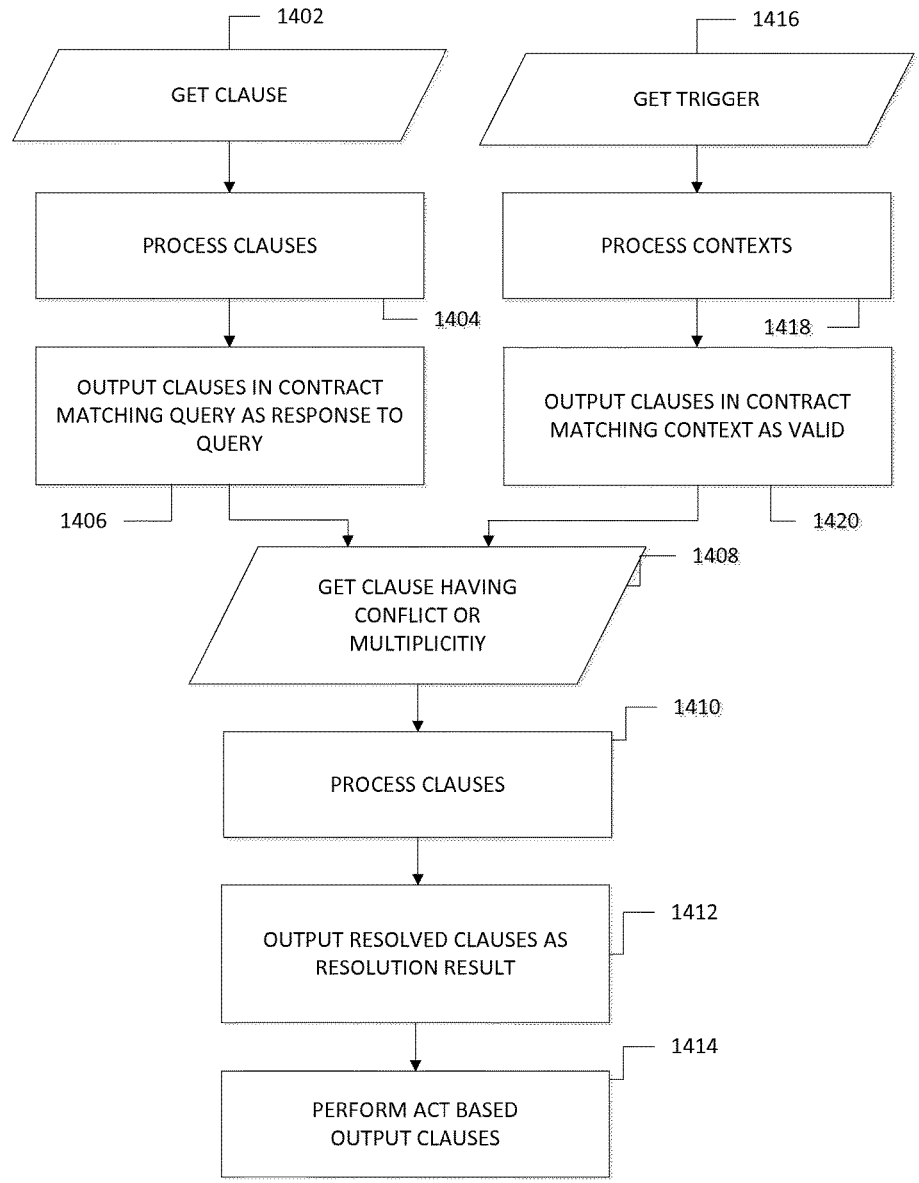
FIG. 14 is a flowchart for illustrating the exemplary composite or hybrid and linked processing of the systems of FIGS. 9 and 10.

FIG. 14 is a flowchart for illustrating the exemplary composite or hybrid and linked processing of the systems of FIGS. 9 and 10. In FIG. 14, steps 1402-1406 correspond to the steps 1102-1112 of the exemplary query-driven processing of FIG. 11, step 1416-1420 correspond to the steps 1202-1212 of the exemplary context-driven processing of FIG. 12, and steps 1408-1412 correspond to the steps 1302-1312 of the exemplary conflict or multiplicity-driven processing of FIG. 13. At step 1414, on or more acts, for example, specified by the act 220 elements can be performed based on the resolved clauses output as the resolution result at step 1412. Additional processing can be performed by repeating the steps 1402-1420.

Advantageously, the exemplary Contract Expression Language defines the grammar employed for processing contract expressions based thereon, wherein the present invention includes the recognition defining a grammar can be the most challenging aspect of a design. The exemplary Contract Expression Language, thus, defines normative mathematical relationships between each one of the EPARC elements, advantageously, enabling consistent interpretation and enforcement of the exemplary Contract Expression Language by human and machines. The defined grammar also allows the exemplary Contract Expression Language to be extensible. Accordingly, an almost infinite number new contract constructs and vocabularies can be expressed with the grammar defined by the exemplary Contract Expression Language.

The devices and subsystems of the exemplary systems described with respect to FIGS. 1-14 can communicate, for example, over a communications network 170, and can include any suitable servers, workstations, personal computers (PCs), laptop computers, PDAs, Internet appliances, set top boxes, modems, handheld devices, telephones, cellular telephones, wireless devices, other devices, and the like, capable of performing the processes of the disclosed exemplary embodiments. The devices and subsystems, for example, can communicate with each other using any suitable protocol and can be implemented using a general-purpose computer system, and the like. One or more interface mechanisms can be employed, for example, including Internet access, telecommunications in any suitable form, such as voice, modem, and the like, wireless communications media, and the like. Accordingly, communications network 170 can include, for example, wireless communications networks, cellular communications networks, satellite communications networks, Public Switched Telephone Networks (PSTNs), Packet Data Networks (PDNs), the Internet, intranets, hybrid communications networks, combinations thereof, and the like.

As noted above, it is to be understood that the exemplary systems, for example, as described with respect to FIGS. 1-14, are for exemplary purposes, as many variations of the specific hardware used to implement the disclosed exemplary embodiments are possible. For example, the functionality of the devices and the subsystems of the exemplary systems can be implemented via one or more programmed computer systems or devices. To implement such variations as well as other variations, a single computer system can be programmed to perform the functions of one or more of the devices and subsystems of the exemplary systems. On the other hand, two or more programmed computer systems or devices can be substituted for any one of the devices and subsystems of the exemplary systems. Accordingly, principles and advantages of distributed processing, such as redundancy, replication, and the like, also can be implemented, as desired, for example, to increase the robustness and performance of the exemplary systems described with respect to FIGS. 1-14.

The exemplary systems described with respect to FIGS. 1-14 can be used to store information relating to various processes described herein. This information can be stored in one or more memories, such as a hard disk, optical disk, magneto-optical disk, RAM, and the like, of the devices and sub-systems of the exemplary systems. One or more databases of the devices and subsystems can store the information used to implement the exemplary embodiments. The databases can be organized using data structures, such as records, tables, arrays, fields, graphs, trees, lists, and the like, included in one or more memories, such as the memories listed above.

All or a portion of the exemplary systems described with respect to FIGS. 1-14 can be conveniently implemented using one or more general-purpose computer systems, microprocessors, digital signal processors, micro-controllers, and the like, programmed according to the teachings of the disclosed exemplary embodiments. Appropriate software can be readily prepared by programmers of ordinary skill based on the teachings of the disclosed exemplary embodiments. In addition, the exemplary systems can be implemented by the preparation of application-specific integrated circuits or by interconnecting an appropriate network of component circuits.

Advantageously, the exemplary embodiments described herein can be employed in offline systems, online systems, and the like, and in applications, such as TV applications, computer applications, DVD applications, VCR applications, appliance applications, CD player applications, and the like. In addition, the signals employed to transmit the Contract Expression Language expressions, the rights expression, and the like, of the exemplary embodiments, can be configured to be transmitted within the visible spectrum of a human, within the audible spectrum of a human, not within the visible spectrum of a human, not within the audible spectrum of a human, combinations thereof, and the like.

Although the exemplary embodiments are described in terms of applications in contracts, legal arenas, and the like, the exemplary embodiments are applicable to any suitable application, such as digital and non-digital content, devices, software, services, goods, resources, and the like, and can be practiced with variations in technology, interface, language, grammar, content, rights, offerings, services, speed, size, limitations, devices, and the like.

While the present invention have been described in connection with a number of exemplary embodiments and implementations, the present invention is not so limited but rather covers various modifications and equivalent arrangements, which fall within the purview of the appended claims.

APPENDIX

The present invention can employ technologies, systems, methods, algorithms, concepts, and the like, described in the articles, books, specifications, and the like, cited herein, the entire contents of all of which are hereby incorporated by reference herein.

[1]. ContentGuard, Inc., eXtensible rights Markup Language (XrML) Version 2.0, available on the World Wide Web at xrml.org.

[4]. Bradner, "Key words for use in RFCs to Indicate Requirement Level," IETF RFC 2119, available on the World Wide Web at ietf.org/rfc/rfc2119.txt.

[11]. W3C XML Schema, available on the World Wide Web at w3.org/2001/XMLSchema.

[12]. W3C XML Signature, available on the World Wide Web at w3.org/2000/09/xmldsig#.
[13]. W3C XML Encryption, available on the World Wide Web at w3.org/2001/04/xmlenc#.
[14]. Calamari, et al., Contracts, 3rd edition, Black Letter Series, West Group, St. Paul, Minn., 1999.
[16]. Calamari, et al., The Law of Contracts, West Wadsworth, 4th edition, July 1998.
[17]. Atiyah, An Introduction to the Law of Contract, Clarendon Law Series, 4th edition, Clarendon Press, Oxford, 1989.
[19]. Dijkstra, A Discipline of Programming, Prentice-Hall, 1976.
[20]. Ullman, Principles of Database and Knowledge-Base Systems, Volume I, 1988, and Volume II, 1989, Computer Science Press.
[21]. Hanson, et al., "An overview of production rules in database systems," Knowledge Engineering Review, vol. 8, no. 2, pp. 121-143, 1993.
[22]. Russell, et al., Artificial Intelligence: A Modern Approach, Prentice Hall Series in Artificial Intelligence, 1995.
[23]. Hohfeld, "Some fundamental legal conceptions as applied in judicial reasoning," Yale Law Journal, v. 23, 1913, Reprinted in W. W. Cook (ed.), Fundamental Legal Conceptions as Applied in Judicial Reasoning, and Other Legal Essays, Yale University Press, 1966.
[24]. Hilpinen (ed.), Deontic Logic: Introductory and Systematic Readings, Dordrecht, 1971.
[25]. Jones, et al., "On the characterization of a trusting agent—aspects of a formal approach," Workshop on Deception, Trust and Fraud in Agent Societies, 2000.
[26]. Elgesem, "The modal logic of agency," Journal of Philosophical Logic, 1997, vol. 2, no. 2, pp. 1-46.
[27]. Widom, et al., Active Database Systems, Morgan-Kaufmann, 1995.
[28]. Brownston, et al., Programming Expert Systems in OPS5: An Introduction to Rule-Based Programming, Addison-Wesley, 1985.
[29]. Damianou, et al., "A Survey of Policy Specification Approaches," 2002, available on the World Wide Web at www-dse.doc.ic.ac.uk/Research/policies.
[30]. Ullman, Principles of Database and Knowledge-base Systems, Vol. II, Rockville, Md., Computer Science Press, 1989.
[31]. Sterling, et al., The Art of Prolog: Advanced Programming Techniques, 2nd Edition, MIT Press, 1994.
[32]. Lampson, et al., "Authentication in Distributed Systems: Theory and Practice," ACM Trans., Computer Systems 10, 4 (November 1992), pp. 265-310.
[33]. Manna, et al., The Temporal Logic of Reactive and Concurrent Systems: Specification, Springer-Verlag, New York, 1991.

What is claimed is:

1. A computer-implemented method executed by one or more computing devices for updating a legality expression for use in a system for processing the legality expression, the method comprising:
   selecting, by at least one of the one or more computing devices, a digital data element of a legality expression, the digital data element being from a legality expression language, the digital data element including at least one of,
      a duty element specifying an obligation that a principal must perform an act, and
      a claim element specifying an assertion that a principal does perform an act;
   selecting at least one of an updated obligation or assertion for the data element;
   determining, by at least one of the one or more computing devices, at least one attribute value for the updated obligation or assertion;
   transforming, by at least one of the one or more computing devices, the digital data element to include the updated attribute value to thereby update the legality expression; and
   recording, by at least one of the one or more computing devices, the updated legality expression in a form that can be enforced by a computing device.

2. The method of claim 1, further comprising enforcing the updated legality expression, by a computing device.

3. The method of claim 1, further comprising:
   providing in the updated legality expression a grant element specifying a permission that a principal may perform an act; and
   enforcing the legality updated expression.

4. The method of claim 1, further comprising specifying a license associated with a contract with a license element associated with the updated legality expression, wherein the contract is specified using the legality expression language.

5. The method of claim 1, wherein the legality expression language is a grammar based language.

6. The method of claim 1, further comprising providing in the legality expression language a validity interval element specifying a time interval during which the legality expression is valid.

7. The method of claim 2, wherein the updated legality expression includes the duty element and enforcing comprises enforcing the obligation based on the duty element by verifying that the principal has performed the act.

8. At least one non-transitory computer-readable medium storing computer-readable instructions that, when executed by one or more computing devices, cause at least one of the one or more computing devices to:
   select a digital data element of a legality expression, the digital data element being from a legality expression language, the digital data element including at least one of,
      a duty element specifying an obligation that a principal must perform an act, and
      a claim element specifying an assertion that a principal does perform an act;
   select at least one of an updated obligation or assertion for the data element;
   determine at least one attribute value for the updated obligation or assertion;
   transform the digital data element to include the updated attribute value to thereby update the legality expression; and
   record the updated legality expression in a form that can be enforced by a computing device.

9. The at least one non-transitory computer-readable medium of claim 8, further storing computer-readable instructions that, when executed by at least one of the one or more computing devices, cause at least one of the one or more computing devices to enforce the updated legality expression.

10. The at least one non-transitory computer-readable medium of claim 8, further storing computer-readable instructions that, when executed by at least one of the one or more computing devices, cause at least one of the one or more computing devices to:

provide in the updated legality expression a grant element specifying a permission that a principal may perform an act; and enforce the updated legality expression.

11. The at least one non-transitory computer-readable medium of claim 8, further storing computer-readable instructions that, when executed by at least one of the one or more computing devices, cause at least one of the one or more computing devices to specify a license associated with a contract with a license element associated with the updated legality expression, wherein the contract is specified using the legality expression language.

12. The at least one non-transitory computer-readable medium of claim 8, wherein the legality expression language is a grammar based language.

13. The at least one non-transitory computer-readable medium of claim 8, further storing computer-readable instructions that, when executed by at least one of the one or more computing devices, cause at least one of the one or more computing devices to provide in the legality expression language a validity interval element specifying a time interval during which the legality expression is valid.

14. The at least one non-transitory computer-readable medium of claim 9, wherein the updated legality expression includes the duty element and further storing computer-readable instructions that, when executed by at least one of the one or more computing devices, cause at least one of the one or more computing devices to enforce the obligation based on the duty element by verifying that the principal has performed the act.

15. An apparatus for specifying a legality expression for use in a system for processing the legality expression, the apparatus comprising:
  one or more processors; and
  one or more memories operatively coupled to at least one of the one or more processors and having instructions stored thereon that, when executed by at least one of the one or more processors, cause at least one of the one or more processors to:
  select a digital data element of a legality expression, the digital data element being from a legality expression language, the digital data element including at least one of,
    a duty element specifying an obligation that a principal must perform an act, and
    a claim element specifying an assertion that a principal does perform an act;
  select at least one of an updated obligation or assertion for the data element;
  determine at least one attribute value for the updated obligation or assertion;
  transform the digital data element to include the updated attribute value to thereby update the legality expression; and
  record the updated legality expression in a form that can be enforced by a computing device.

16. The apparatus of claim 15, wherein at least one of the one or more memories has further instructions stored thereon that, when executed by at least one of the one or more processors, cause at least one of the one or more processors to enforce the updated legality expression.

17. The apparatus of claim 15, wherein at least one of the one or more memories has further instructions stored thereon that, when executed by at least one of the one or more processors, cause at least one of the one or more processors to:
  provide in the legality expression language a grant element specifying a permission that a principal may perform an act; and
  enforce the updated legality expression.

18. The apparatus of claim 15, wherein at least one of the one or more memories has further instructions stored thereon that, when executed by at least one of the one or more processors, cause at least one of the one or more processors to specify a license associated with a contract with a license element associated with the updated legality expression, wherein the contract is specified using the legality expression language.

19. The apparatus of claim 15, wherein the legality expression language is a grammar based language.

20. The apparatus of claim 15, wherein at least one of the one or more memories has further instructions stored thereon that, when executed by at least one of the one or more processors, cause at least one of the one or more processors to provide in the legality expression language a validity interval element specifying a time interval during which the updated legality expression is valid.

21. The apparatus of claim 16, wherein the updated legality expression includes the duty element and at least one of the one or more memories has further instructions stored thereon that, when executed by at least one of the one or more processors, cause at least one of the one or more processors to enforce the obligation based on the duty element by verifying that the principal has performed the act.

* * * * *